United States Patent
Hayes

(10) Patent No.: US 7,452,927 B2
(45) Date of Patent: Nov. 18, 2008

(54) ALIPHATIC-AROMATIC POLYESTERS, AND ARTICLES MADE THEREFROM

(75) Inventor: Richard Allen Hayes, Beaumont, TX (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 440 days.

(21) Appl. No.: 10/768,297

(22) Filed: Jan. 30, 2004

(65) Prior Publication Data

US 2005/0171250 A1    Aug. 4, 2005

(51) Int. Cl.
*C08K 3/34* (2006.01)
*C08L 1/00* (2006.01)

(52) U.S. Cl. .............. 523/223; 428/357; 428/364; 528/295; 528/295.3; 528/296; 528/298; 528/300; 528/301; 528/302; 528/308; 528/308.6

(58) Field of Classification Search ............ 428/357, 428/364; 528/295, 295.3, 296, 298, 300, 528/301, 302, 308, 308.6; 523/223; 525/451
See application file for complete search history.

(56) References Cited

U.S. PATENT DOCUMENTS

| | | | |
|---|---|---|---|
| 3,563,942 A | 2/1971 | Heiberger | |
| 3,634,541 A | 1/1972 | Popp et al. | |
| 3,779,993 A | 12/1973 | Kibler et al. | |
| 4,104,262 A | 8/1978 | Schade | |
| 4,340,519 A | 7/1982 | Kotera et al. | |
| 4,476,189 A | 10/1984 | Posey et al. | |
| 5,171,308 A | 12/1992 | Gallagher et al. | |
| 5,171,309 A | 12/1992 | Gallagher et al. | |
| 5,219,646 A | 6/1993 | Gallagher et al. | |
| 5,295,985 A | 3/1994 | Romesser et al. | |
| 5,936,045 A | 8/1999 | Warzelhan et al. | |
| 6,018,004 A | 1/2000 | Warzelhan et al. | |
| 6,046,248 A | 4/2000 | Warzelhan et al. | |
| 6,114,042 A | 9/2000 | Warzelhan et al. | |
| 6,187,422 B1 | 2/2001 | Murschall et al. | |
| 6,201,034 B1 | 3/2001 | Warzelhan et al. | |
| 6,258,924 B1 | 7/2001 | Warzelhan et al. | |
| 6,297,347 B1 | 10/2001 | Warzelhan et al. | |
| 6,342,304 B1 | 1/2002 | Buchanan et al. | |
| 6,358,604 B1 * | 3/2002 | Peiffer et al. ............ 428/336 |
| 6,368,710 B1 * | 4/2002 | Hayes ..................... 428/364 |
| 6,652,964 B1 | 11/2003 | Kato et al. | |
| 2003/0036626 A1 | 2/2003 | Hayes et al. | |

FOREIGN PATENT DOCUMENTS

| | | |
|---|---|---|
| CA | 893216 | 9/1972 |
| DE | 4432161 | 3/1996 |
| EP | 1 245 604 A1 | 10/2002 |
| WO | WO 95/16562 | 6/1995 |
| WO | WO 96/38282 | 12/1996 |
| WO | WO 97/00284 | 1/1997 |
| WO | WO 01/19909 A1 | 3/2001 |
| WO | WO 02/16468 A1 | 2/2002 |
| WO | WO 2004/011524 A2 | 2/2004 |

OTHER PUBLICATIONS

PCT International Search Report for International application No. PCT/US2005/003340, dated May 19, 2005.

* cited by examiner

*Primary Examiner*—Kriellion A Sanders
(74) *Attorney, Agent, or Firm*—Gail D. Tanzer

(57) ABSTRACT

Sulfonated aliphatic-aromatic polyester compositions having improved thermal properties, and articles such as films, coatings and laminates, produced from the sulfonated aliphatic-aromatic polyester compositions, are provided. Some of the films are biocompostable. Films made from the sulfonated aliphatic-aromatic copolyesters can be used to make shaped articles, such as sheets, thermoformed containers, and coatings for, for example, films and other substrates. The sulfonated aliphatic-aromatic copolyesters are produced from a mixture of aromatic dicarboxylic acids, aliphatic dicarboxylic acids, certain glycols, and components containing alkali metal or alkaline earth metal sulfonate groups, such as a metal 5-sulfoisophthalic acid derivative.

87 Claims, No Drawings

ALIPHATIC-AROMATIC POLYESTERS, AND ARTICLES MADE THEREFROM

BACKGROUND

The inadequate treatment of municipal solid waste being put in landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs of recycling and the infrastructure required to recycle materials is sometimes prohibitive. In addition, there are some products which do not easily fit into the framework of recycling. The composting of non-recyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is thus desirable to provide components that are useful in disposable products and can be degraded into less contaminating forms under the conditions typically existing in waste composting processes. These conditions can include temperatures no higher than 70° C., and averaging in the 55-60° C. range; humid conditions as high as 100 percent relative humidity; and exposure times ranging from weeks to months. It is further desirable to provide disposable components that will not only degrade aerobically/anaerobically in composting, but will continue to degrade in soil or landfill. It is highly desirable that, in the presence of water, the components continue to break down into low molecular weight fragments that can be biodegraded by microorganisms into biogas, biomass, and liquid leachate, as occurs with natural organic materials such as wood.

Biodegradable films are known. For example, Wielicki, in U.S. Pat. No. 3,602,225, discloses the use of barrier films comprising plasticized, regenerated cellulose films. Comerford, et. al., in U.S. Pat. No. 3,952,347, disclose biodegradable films comprising a non-biodegradable matrix, such as poly(vinyl alcohol), and about 40 to 60 weight percent of a biodegradable materials, such as starch.

Biodegradable polyesters are known and can be grouped into three general classes; aliphatic polyesters, aliphatic-aromatic polyesters and sulfonated aliphatic-aromatic polyesters.

Aliphatic polyesters, as used herein, are polyesters derived solely from aliphatic dicarboxylic acids, such as poly(ethylene succinate) and poly(1,4-butylene adipate); and poly(hydroxyalkanates), such as polyhydroxybutyrate, polylactide, polycaprolactone, and polyglycolide. For example, Clendinning, et. al., in U.S. Pat. No. 3,932,319, disclose the use of biodegradable aliphatic polyesters, such as poly(ethylene adipate), in biodegradable blends, and Casey, et. al., in U.S. Pat. No. 4,076,798, discloses biodegradable resins derived from diglycolic acid and an unhindered glycol.

Aliphatic-aromatic polyesters, as used herein, include polyesters derived from a mixture of aliphatic dicarboxylic acids and aromatic dicarboxylic acids. For example, Sublett, in U.S. Pat. No. 4,419,507, discloses copolyesters derived from 100 mole percent of a dibasic acid component comprising 40-100 mole percent terephthalic acid and 0-60 mole percent of a second dicarboxylic acid containing 3-12 carbon atoms and 100 mole percent of glycol component comprising 40-100 mole percent 1,4-butanediol and 0-60 mole percent di(ethylene glycol), an example of which is a polyester prepared from 50 mole percent glutaric acid and 50 mole percent of terephthalic acid with 1,4-butanediol.

Films and coated substrates of aliphatic-aromatic polyesters are disclosed, for example, by Gallagher, et. al., in U.S. Pat. No. 5,171,308; Warzelhan, et. al., in U.S. Pat. Nos. 6,114,042 and 6,201,034. Examples of aliphatic-aromatic polyesters disclosed by Buchanan, et. al., in U.S. Pat. No. 6,342,304 include poly(1,6-hexylene terephthalate-co-glutarate, (50:50, molar)), poly(1,4-butylene terephthalate-co-glutarate, (40:60, molar)), poly(1,4-butylene terephthalate-co-glutarate, (60:40, molar)), poly(1,4-butylene terephthalate-co-succinate, (30:70, molar)), (poly(1,4-butylene Terephthalate-co-succinate, (15:85, molar)), poly(1,4-butylene-terephthalate-co-glutarate, (45:55, molar)), and poly(1,4-butylene terephthalate-co-glutarate-co-diglycolate, (45:50:5, molar)).

Sulfonated aliphatic-aromatic polyesters, as used herein, include polyesters derived from a mixture of aliphatic dicarboxylic acids and aromatic dicarboxylic acids and having incorporated therein a sulfonated monomer such as a salt of 5-sulfoisophthalic acid. Heilberger, in U.S. Pat. No. 3,563,942, discloses aqueous dispersions of solvent soluble linear sulfonated aliphatic-aromatic copolyesters including from 0.1 to 10 mole percent of the sulfonated aromatic monomer. Popp, et. al., in U.S. Pat. No. 3,634,541, discloses fiber-forming sulfonated aliphatic-aromatic copolyesters including 0.1 to 10 mole percent of xylylene sulfonated salt monomers. Kibler, et. al., in U.S. Pat. No. 3,779,993, discloses linear, sulfonated aliphatic-aromatic copolyesters including 2 to 12.5 mole percent of a sulfomonomer. Schade, in U.S. Pat. No. 4,104,262, disclose low molecular weight, water dispersible polyesters including 1-5 mole percent of an alkali metal-sulfonate group.

Films derived from sulfonated aliphatic-aromatic polyesters are known and are disclosed, for example, by Gallagher, et. al., in U.S. Pat. No. 5,171,308. Sulfonated aliphatic-aromatic polyester films filled with starch are also disclosed therein. Laminated substrates with sulfonated aliphatic-aromatic polyesters are also disclosed in U.S. Pat. No. 5,171,308.

Warzelhan, et. al., in U.S. Pat. Nos. 6,018,004, 6,114,042, and 6,201,034, disclose generally certain sulfonated aliphatic-aromatic copolyester compositions and their use in substrate coatings, films, and foams. However, there is no exemplification of compositions including the 1,3-propanediol disclosed herein and/or the surprisingly improved thermal properties of the compositions of the present invention.

Known biodegradable packaging materials typically include blends, and some published work in the area suggests that a single polymer does not have sufficient stability over wide temperature ranges for use in packaging. For example, the use of a single polymer or copolymer for use as packaging materials is disclosed as not advantageous by Khemani, et. al., in WO 02/16468 A1.

Examples of known biodegradable materials for use in packaging include; EcoFoam®, a product of the National Starch Company of Bridgewater, N.J., which is a hydroxypropylated starch product, and EnviroFil®, a product of the EnPac Company, a DuPont-Con Agra Company. For example, Collinson, in U.S. Pat. No. 5,178,469, disclose the use of a cellulose film or cellophane on a Kraft paper for use of a collapsible biodegradable container, such as a bag, for liquid-containing solids. Tanner, et. al., in U.S. Pat. No. 5,213,858, disclose a biodegradable paperboard laminate structure consisting of a paperboard substrate, an exterior layer of a low temperature extrusion coatable, heat sealable biodegradable polymer, such as poly(vinyl alcohol) or starch, and an interior layer of a heat sealable, non-biodegradable polymer, such as polyethylene. The substrate can be used to produce, for example, cups, containers, and food packages. Franke, et. al., in U.S. Pat. No. 5,512,090, describe an extrudable biodegradable packaging material composed mainly of starch with vegetable oil, poly(vinyl alcohol), glycerin proteinaceous grain meal, glycerol monostearate, and optionally water. The compositions are disclosed to produce low density, foam substrate type products. Redd, et. al., in U.S. Pat. No. 6,106, 753, disclose molded biodegradable articles from a mixture consisting of 80 to 90 percent of a starch and 20 to 10 weight percent of a biodegradable polymer. They further disclose the lamination of a biodegradable film onto the article. The use of biodegradable materials for packaging is also disclosed, for example, in U.S. Pat. Nos. 3,137,592, 4,673,438, 4,863,655, 5,035,930, 5,043,196 5,095,054, 5,300,333, and 5,413,855.

Although aliphatic-aromatic copolyester and sulfonated aliphatic-aromatic copolyester compositions and their use in forming films, coatings, and laminates, and the use thereof in, for example, fast food disposable packaging is known, improved properties in such copolyesters are desired. Exemplary disclosures of such copolyesters and their use include Gallagher, et. al., in U.S. Pat. Nos. 5,171,308, 5,171,309, and 5,219,646, the disclosures of Buchanan, et. al., in U.S. Pat. Nos. 5,446,079 and 6,342,304, and the disclosures of Warzelhan, et. al., in U.S. Pat. Nos. 5,936,045, 6,018,004, 6,046, 248, 6,114,042, 6,201,034, 6,258,924 and U.S. Pat. No. 6,297,347. Typically, the sulfonated aliphatic-aromatic copolyesters based on ethylene glycol tend to have greater crystalline melting points than those based on 1,4-butanediol, but can have relatively low crystallinity and crystallization rates, especially when they contain relatively larger ratios of an aliphatic dicarboxylic acid component. On the other hand, the known sulfonated aliphatic-aromatic copolyesters based on 1,4-butanediol tend to have good crystallinity and crystallization rates, but suffer from lower crystalline melting points, especially those containing greater amounts of an aliphatic dicarboxylic acid component. Moreover, some such sulfonated aliphatic-aromatic copolyesters do not provide sufficient or optimal temperature characteristics, such as crystalline melting point, crystallinity and crystallization rate, for such significant end uses such as film, coatings and laminates.

The present invention provides sulfonated aliphatic-aromatic copolyesters derived from 1,3-propanediol. The sulfonated aliphatic-aromatic copolyesters disclosed herein provide improved thermal properties in comparison with some known copolyesters. In particular, the sulfonated aliphatic-aromatic copolyesters disclosed herein provide a desirable balance of high temperature properties not disclosed for known aliphatic-aromatic copolyesters.

While blends have been used in order to obtain a desirable balance of physical and/or thermal properties in polyesters, as disclosed, for example, in WO 02/16468 A1, as one skilled in the art will appreciate, the use of polymeric blends necessarily complicates the processes used to produce the film, coating, and laminates. The present invention eliminates the need to utilize blends and provides sulfonated aliphatic-aromatic copolyesters having optimized thermal and physical properties. However, blends containing the sulfonated aliphatic-aromatic copolyesters disclosed herein are within the scope of the present invention.

SUMMARY OF THE INVENTION

One aspect of the present invention includes certain sulfonated aliphatic-aromatic copolyesters and processes for producing the sulfonated aliphatic-aromatic copolyesters.

The sulfonated-aliphatic aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component.

The sulfonated aliphatic-aromatic copolyesters can include fillers. The sulfonated aliphatic-aromatic copolyesters have an improved balance of a high crystalline melting temperature in combination with a high level of crystallinity, as compared with known sulfonated aliphatic-aromatic copolyesters. In some embodiments, the sulfonated aliphatic-aromatic copolyesters are biodegradable.

A further aspect of the present invention includes shaped articles produced from sulfonated aliphatic-aromatic copolyesters comprising an acid component, a glycol component, and 0 to about 5.0 mole percent of a polyfunctional branching agent, and processes for producing the shaped articles. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. In some embodiments, the sulfonated aliphatic-aromatic copolyesters contain fillers.

Another aspect of the present invention includes film made from sulfonated aliphatic-aromatic copolyesters comprising an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. The sulfonated aliphatic-aromatic copolyesters can include fillers. In some embodiments, the films made from the sulfonated aliphatic-aromatic copolyesters are oriented. In some embodiments, the oriented films containing the sulfonated aliphatic-aromatic copolyesters are uniaxially oriented. In some embodiments, the oriented films containing the sulfonated aliphatic-aromatic copolyesters are biaxially oriented.

A further aspect of the present invention includes laminates and processes for producing the laminates. The laminates comprise films laminated onto substrates, which substrates comprise certain sulfonated aliphatic-aromatic copolyesters. The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. Examples of substrates that can be laminated with the sulfonated aliphatic-aromatic copolyesters include paper, paperboard, inorganic foams, organic foams, and inorganic-organic foams. In some embodiments, the sulfonated aliphatic-aromatic copolyesters include fillers.

A further aspect of the present invention includes films coated onto substrates comprising sulfonated aliphatic-aromatic copolyesters, and processes to produce the film-coated substrates. Suitable substrates for coating with the sulfonated aliphatic-aromatic copolyesters include, for example, paper, paperboard, inorganic foams, organic foams, and inorganic-organic foams. The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. The sulfonated aliphatic-aromatic copolyesters can include fillers.

A further aspect of the present invention includes packaging comprising certain sulfonated aliphatic-aromatic copolyesters. Preferred embodiments include disposable food packaging such as food wraps. The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. The sulfonated aliphatic-aromatic copolyesters can include fillers.

A further aspect of the present invention includes substrates laminated with sulfonated aliphatic-aromatic copolyesters. In preferred embodiments, the laminated substrates are used for food packaging or food service. Substrates laminated with the sulfonated aliphatic-aromatic copolyesters include, for example, paper, paperboard, inorganic foams, organic foams, and inorganic-organic foams. The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. The sulfonated aliphatic-aromatic copolyesters can include fillers.

A further aspect of the present invention includes the use of films coated onto substrates comprising sulfonated aliphatic-aromatic copolyesters in making food packaging or food service end uses. Examples of substrates include paperboard, inorganic foams, organic foams, and inorganic-organic foams. The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component. The sulfonated aliphatic-aromatic copolyesters can include fillers.

These and other aspects of the present invention will be apparent to one skilled in the art in view of the following disclosures and the appended claims.

DETAILED DESCRIPTION

The present invention includes compositions, shaped articles, preferably such as films, coatings, and laminates, of certain sulfonated aliphatic-aromatic copolyesters and processes for producing the sulfonated aliphatic-aromatic copolyesters. The present invention further includes food packaging containing the sulfonated aliphatic-aromatic copolyesters, especially disposable food packaging such as wraps, cups, bowls, plates. In such packaging, the sulfonated aliphatic-aromatic copolyesters can be in films, coatings on substrates such as paper, paperboard, inorganic foams, organic foams, and inorganic-organic foams, or in laminates on substrates such as, for example, paper, paperboard, inorganic foams, organic foams, and inorganic-organic foams.

The sulfonated aliphatic-aromatic copolyesters comprise an acid component, a glycol component, and 0 to about 5.0 mole percent of a polyfunctional branching agent. The acid component comprises about 94.9 to 10.0 mole percent of an aromatic dicarboxylic acid component based on 100 mole percent total acid component, about 5.0 to 80.0 mole percent of an aliphatic dicarboxylic acid component, based on 100 mole percent total acid component, and about 0.1 to about 5.0 mole percent of a sulfonate component. The glycol component consists essentially of 100.0 to 90.0 mole percent of 1,3-propanediol as a first glycol component, based on 100 mole percent total glycol component, and 0 to 5.0 mole percent of a second glycol component, based on 100 mole percent total glycol component.

Percentages of components of the sulfonated aliphatic-aromatic copolyesters, as presented herein, add up to a total of 200 mole percent. As will be understood by those skilled in the art, the 200 mole percent includes 100 mole percent of combined dicarboxylic acid and sulfonate components; and 100 mole percent of combined 1,3-propanediol, optional other glycol components and optional polyfunctional branching agent. Ranges of percentages, weights, and other quantities recited herein are intended to include the recited endpoints of the ranges as well as each and every intermediate point within the range. Thus, as an example only, the range "0.1 to 5 mole percent of a sulfonate component" includes 0.1, 0.2, 0.3, 0.5, 0.6, 0.7, 0.8, 0.9 and 1.0 mole percent, as well as points there between, and up to and including 5 mole percent.

The aromatic dicarboxylic acid component is preferably selected from unsubstituted and substituted aromatic dicarboxylic acids and the lower alkyl esters of aromatic dicarboxylic acids having from 8 carbons to 20 carbons. Examples of desirable diacid moieties in the dicarboxylic acid component include those derived from terephthalates, isophthalates, naphthalates and bibenzoates. Specific examples of desirable aromatic dicarboxylic acid components include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl -4,4'-methylenebis(benzoate), and mixtures derived therefrom. As used herein, the term "mixtures derived therefrom" in connection with a list of compounds or other components includes any combination of two or more of the components in the list, but is not intended to mean that a component in the list must be reacted with any other material. Preferably, the aromatic dicarboxylic acid component is derived from terephthalic acid, dimethyl terephthalate, isophthalic acid, dimethyl isophthalate, 2,6-naphthalene dicarboxylic acid, dimethyl-2,6-naphthalate, and mixtures derived therefrom. Any aromatic dicarboxylic acid known can be used.

The sulfonated aliphatic-aromatic copolyesters disclosed herein are also referred to herein, for convenience, as "the copolyester compositions". Preferably, the copolyester compositions include between 85 and 20 mole percent of the aromatic dicarboxylic acid component, based on the total of dicarboxylic acid components and sulfonate component. More preferably, the copolyester compositions include between 80 and 40 mole percent of the aromatic dicarboxylic acid component.

The aliphatic dicarboxylic acid component is preferably selected from unsubstituted and substituted, linear and branched, aliphatic dicarboxylic acids and the lower alkyl esters of aliphatic dicarboxylic acids having from 2 to 36 carbon atoms. Specific examples of desirable aliphatic dicarboxylic acid components include oxalic acid, dimethyl oxalate, malonic acid, dimethyl malonate, succinic acid, dimethyl succinate, methylsuccinc acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom. Preferably, the aliphatic dicarboxylic acid component is selected from the group of succinc acid, dimethyl succinate, glutaric acid, dimethyl glutarate, adipic acid, dimethyl adipate and mixtures derived therefrom. Any aliphatic dicarboxylic acid known can be used. Preferably, the copolyester compositions include between 15 and 80 mole percent of the aliphatic dicarboxylic acid component. More preferably, the copolyester compositions include between 20 and 60 mole percent of the aromatic dicarboxylic acid component.

The sulfonated aliphatic-aromatic copolyesters contain from 0.1 to 5 mole percent of sulfonate groups. While it is not intended that the present invention be bound by any particular theory, it is believed that the presence of the sulfonate groups enhances the biodegradation rates of the copolyesters. For example, in some embodiments, the copolyesters disclosed herein biodegrade at a rate at least 10 percent faster than known copolyesters without such sulfonate groups. The sulfonate groups can be introduced in aliphatic or aromatic monomers or can be introduced as endgroups. Exemplary aliphatic sulfonate components include metal salts of sulfosuccinic acid. Exemplary aromatic sulfonate components useful as endgroups include metal salts of 3-sulfobenzoic acid, 4-sulfobenzoic acid, and 5-sulfosalicylic acid. Preferred are sulfonate components containing a sulfonate salt group attached to an aromatic dicarboxylic acid. Exemplary aromatic nuclei that can be present in the aromatic dicaraboxylic acid include benzene, naphthalene, diphenyl, oxydiphenyl, sulfonyldiphenyl, methylenediphenyl. Preferably, the sulfonate component is the residue of a sulfonate-substituted phthalic acid, terephthalic acid, isophthalic acid, or 2,6-naphthalenedicarboxylic acid. More preferably, the sulfonate component is a metal salt of 5-sulfoisophthalic acid or a lower alkyl ester of 5-sulfoisophthalate. The metal salt can be selected from monovalent or polyvalent alkali metal ions, alkaline earth metal ions, or other metal ions. Preferred alkali metal ions include sodium, potassium and lithium. However, alkaline earth metals such as magnesium are also useful. Other useful metal ions include the transition metal ions, such as zinc, cobalt or iron The multivalent metal ions are useful, for example, when an increased viscosity of the sulfonated aliphatic-aromatic copolyesters is desired. End use examples where such melt viscosity enhancements may prove useful include melt extrusion coatings, melt blown containers or film, and foam. As little as 0.1 mole percent of the sulfonate group contributes significantly to the property characteristics of the resultant films or coatings. More preferably, the amount of sulfonate group-containing component in the sulfonated aliphatic-aromatic copolyester is 0.1 to 4.0 mole percent.

The second glycol component is preferably selected from unsubstituted, substituted, straight chain, branched, cyclic aliphatic, aliphatic-aromatic and aromatic diols having from 2 carbon atoms to 36 carbon atoms. Specific examples of desirable other glycol components include ethylene glycol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl) -tricyclo[5.2.1.0/2.6]decane, 1,4-cyclohexanedimethanol, isosorbide, di(ethylene glycol), tri(ethylene glycol), poly (alkylene ether)glycols which have a molecular weight in the range of about 500 to about 4000, for example; poly(ethylene glycol), poly(1,3-propylene glycol), poly(1,4-butylene glycol), (polytetrahydrofuran), poly(pentmethylene glycol), poly(hexamethylene glycol), poly(hepthamethylene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene) bisphenol ethoxylate (Bisphenol AP ethoxylate), 4,4'-ethylidenebisphenol ethoxylate (Bisphenol E ethoxylate), bis (4-hydroxyphenyl)methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate (Bisphenol P ethoxylate), 4,4'sulfonyldiphenol ethoxylate (Bisphenol S ethoxylate), 4,4'-cyclohexylidenebisphenol ethoxylate (Bisphenol Z ethoxylate), and mixtures derived therefrom. Any known glycol can be used.

The optional polyfunctional branching agent is meant to include any material with three or more carboxylic acid functions, hydroxy functions or a mixture thereof. Specific examples of the desirable polyfunctional branching agent component include 1,2,4-benzenetricarboxylic acid, (trimellitic acid), trimethyl-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxylic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and mixtures derived therefrom. Any polyfunctional material containing three or more carboxylic acid or hydroxyl functions can be used as a branching agent. The use of a polyfunctional branching agent may be desirable when higher resin melt viscosity is desired for specific end uses. Examples of such end uses include melt extrusion coatings, melt blown films or containers, and foam. Preferably, the aliphatic-aromatic copolyester comprises 0 to 1.0 mole percent of the polyfunctional branching agent.

To give the desired physical properties, the sulfonated aliphatic-aromatic copolyesters preferably have an inherent viscosity, (IV), of at least 0.15. More desirably, the inherent viscosity of the sulfonated aliphatic-aromatic copolyesters is at least 0.35 dL/g, as measured on a 0.5 percent (weight/volume) solution of the copolyester in a 50:50 (weight) solution of trifluoroacetic acid:dichloromethane solvent system at room temperature. These inherent viscosities will be sufficient for some applications. Higher inherent viscosities are desirable for many other applications, such as, for example, films, bottles, sheet, and molding resin. The polymerization conditions can be adjusted to obtain such higher desired inherent viscosities and can produce copolyesters having inherent viscosities of 0.7, 0.8, 0.9, 1.0, 1.5, or 2.0 dL/g and even higher.

The IV of the sulfonated aliphatic-aromatic copolyester is an indicator of molecular weight, as will be recognized by one skilled in the art. The molecular weight of some polymers is normally not measured directly. Instead, the inherent viscosity of the polymer in solution or the melt viscosity is used as an indicator of molecular weight. The inherent viscosities are an indicator of molecular weight for comparisons of samples within a polymer family, such as poly(ethylene terephthalate), poly(butylene terephthalate), etc., and are used as an indicator of molecular weight herein.

The sulfonated aliphatic-aromatic copolyesters can be prepared by conventional polycondensation techniques. The product compositions can vary somewhat based on the method of preparation used, particularly with regard to the amount of diol in the copolyester. Polycondensation processes include the reaction of the diol monomers with the acid chlorides. For example, acid chlorides of the aromatic dicarboxylic acid component, acid chlorides of the aliphatic dicarboxylic acid component, and acid chlorides of the sulfonate component can be combined with the 1,3-propanediol and the second glycol component in a solvent, such as toluene, in the presence of a base, such as pyridine, which neutralizes the hydrochloric acid as it is produced. Such procedures are known and are disclosed, for example, in R. Storbeck, et. al., in *J. Appl. Polymer Science,* Vol. 59, pp. 1199-1202 (1996), the disclosures of which are hereby incorporated herein by reference. Other well-known variations using acid chlorides may also be used, such as interfacial polymerization, or the monomers may simply be stirred together while heating.

When the copolyester is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components can be used to obtain a desirably high molecular weight in the polymer.

Preferably, the sulfonated aliphatic-aromatic copolyesters are made using a melt polymerization process. In melt polymerization processes, the aromatic dicarboxylic acid component as acid(s), ester(s), or mixtures derived therefrom, the aliphatic dicarboxylic acid component as acid(s), ester(s), or mixtures derived therefrom, the sulfonate component, the 1,3-propanediol, the optional other glycol component and optionally the polyfunctional branching agent, are combined in the presence of a catalyst at a sufficiently high temperature that the monomers combine to form esters and diesters, then oligomers, and finally polymers. The product of the polymerization process is a molten product. Generally, the second glycol component and the 1,3-propanediol are volatile and the excess distills from the reactor as the polymerization proceeds. Such procedures are generally known to those skilled in the art.

The melt process conditions, particularly with regard to the amounts of monomers used, depend on the polymer composition desired. The amount of 1,3-propanediol, other glycol component, aromatic dicarboxylic acid component, aliphatic acid component, sulfonate compound and optional branching agent are desirably chosen so that the final polymeric product contains the desired amounts of the various monomer units, desirably with equimolar amounts of monomer units derived from the respective diol and diacid components. Because of the volatility of some of the monomers, especially some of the second glycol components and the 1,3-propanediol component, and depending on such variables as whether the reactor is sealed, (i.e.; is under pressure), the polymerization temperature ramp rate, and the efficiency of the distillation columns used in synthesizing the polymer, some of the monomers can be included in excess at the beginning of the polymerization reaction and removed by distillation as the reaction proceeds. This is particularly true of the second glycol component and of the 1,3-propanediol component.

The amount of monomers to be charged to a particular reactor can be determined by a skilled practitioner, but often will be within the following ranges. Excesses of the diacid, the 1,3-propanediol component, and the other glycol are often desirably charged, and the excess diacid, 1,3-propanediol, and other glycol are desirably removed by distillation or other means of evaporation as the polymerization reaction proceeds. 1,3-propanediol is desirably charged in an amount 10 to 100 percent greater than the desired incorporation level in the final polymer. More preferably, the 1,3-propanediol component is charged in an amount 20 to 70 percent greater than the desired incorporation level in the final polymer. The second glycol component can charged in an amount 0 to 100 percent greater than the desired incorporation level in the final product, depending in part upon the volatility of the second glycol component.

The ranges given for the monomers are very wide because of the wide variation in the monomer loss during polymerization, depending, for example, on the efficiency of distillation columns and other kinds of recovery and recycle systems, and are only an approximation. Preferred amounts of monomers to be charged to a reactor to achieve a specific desired composition can be determined by a skilled practitioner.

In a preferred polymerization process, the monomers are combined, and heated gradually with mixing in the presence of a catalyst or catalyst mixture to a temperature in the range of 200° C. to about 300° C., desirably 220° C. to 295° C. The conditions and the catalysts depend in part upon whether the diacids are polymerized as true acids or as dimethyl esters. The catalyst can be included initially with the reactants, and/or can be added one or more times to the mixture as it is heated. The heating and stirring are continued for a sufficient time and to a sufficient temperature, generally with removal of excess reactants by distillation, to yield a molten polymer having a high enough molecular weight to be suitable for making fabricated products.

Catalysts that can be used include salts of Li, Ca, Mg, Mn, Zn, Pb, Sb, Sn, Ge, and Ti, such as acetate salts and oxides, including glycol adducts, and Ti alkoxides. Such catalysts are known, and a catalyst or combination or sequence of catalysts used can be selected by a skilled practitioner. The preferred catalyst and preferred conditions can vary depending upon, for example, whether the diacid monomer is polymerized as the free diacid or as a dimethyl ester, and/or on the chemical composition of the glycol components. The catalyst used can be modified as the reaction proceeds. Any catalyst system known for use in such polymerizations can be used.

The monomer composition of the polymer can be selected for specific uses and for specific sets of properties. As one skilled in the art will appreciate, the thermal properties observed are determined by the chemical identity and level of each component utilized in the copolyester composition. Sulfonated aliphatic-aromatic copolyesters having adequate inherent viscosity for many applications can be made by the melt condensation processes disclosed hereinabove. Solid state polymerization can be used to obtain even higher inherent viscosities (molecular weights).

The copolyester made by melt polymerization, after extruding, cooling and pelletizing, may be essentially noncrystalline. Noncrystalline material can be made semicrystalline by heating it to a temperature above the glass transition temperature for an extended period of time. This induces crystallization so that the product can then be heated to a higher temperature to raise the molecular weight. If desired, the polymer can be crystallized prior to solid-state polymerization by treatment with a relatively poor solvent for polyesters, which induces crystallization by reducing the $T_g$. Solvent induced crystallization is known for polyesters and is disclosed, for example, in U.S. Pat. Nos. 5,164,478 and 3,684,766.

The semicrystalline polymer can then be subjected to solid state polymerization by placing the pelletized or pulverized polymer into a stream of an inert gas, usually nitrogen, or under a vacuum of 1 Torr, at an elevated temperature, but below the melting temperature of the polymer for an extended period of time until the desired molecular weight is achieved.

The sulfonated aliphatic-aromatic copolyesters can be used with, or contain, known additives. It is preferred that the additives are nontoxic, biodegradable and biobenign. Such additives include thermal stabilizers such as, for example, phenolic antioxidants; secondary thermal stabilizers such as, for example, thioethers and phosphates; UV absorbers such as, for example benzophenone- and benzotriazole-derivatives; and UV stabilizers such as, for example, hindered amine light stabilizers (HALS). Other optional additives include plasticizers, processing aids, flow enhancing additives, lubricants, pigments, flame retardants, impact modifiers, nucleating agents to increase crystallinity, antiblocking agents such as silica, and base buffers such as sodium acetate, potassium acetate, and tetramethyl ammonium hydroxide, (for example, as disclosed in U.S. Pat. Nos. 3,779,993, 4,340, 519, 5,171,308, 5,171,309, and 5,219,646 and references cited therein). Exemplary plasticizers, which may be added to improve processing and/or final mechanical properties, or to reduce rattle or rustle of the films, coatings, or laminates made from the copolyesters, include soybean oil, epoxidized soybean oil, corn oil, caster oil, linseed oil, epoxidized linseed oil, mineral oil, alkyl phosphate esters, plasticizers sold under the trademark "Tween" including Tween® 20 plasticizer, Tween® 40 plasticizer, Tween® 60 plasticizer, Tween® 80 plasticizer, Tween® 85 plasticizer, sorbitan monolaurate, sorbitan monooleate, sorbitan monopalmitate, sorbitan trioleate, sorbitan monostearate, citrate esters, such as trimethyl citrate, triethyl citrate (Citroflex® 2, produced by Morflex, Inc. Greensboro, N.C.), tributyl citrate (Citroflex® 4, produced by Morflex, Inc., Greensboro, N.C.), trioctyl citrate, acetyltri-n-butyl citrate (Citroflex® A4, produced by Morflex, Inc., Greensboro, N.C.), acetyltriethyl citrate (Citroflex® A-2, produced by Morflex, Inc., Greensboro, N.C.), acetyltri-n-hexyl citrate (Citroflexe A-6, produced by Morflex, Inc., Greensboro, N.C.), and butyryltri-n-hexyl citrate (Citroflex® B-6, produced by Morflex, Inc., Greensboro, N.C.), tartarate esters, such as dimethyl tartarate, diethyl tartarate, dibutyl tartarate, and dioctyl tartarate, poly(ethylene glycol), derivatives of poly(ethylene glycol), paraffin, monoacyl carbohydrates, such as 6-O-sterylglucopyranoside, glyceryl monostearate, Myvaplex® 600 (concentrated glycerol monostearates), Nyvaplex® (concentrated glycerol monostearate which is a 90% minimum distilled monoglyceride produced from hydrogenated soybean oil and which is composed primarily of stearic acid esters), Myvacet (distilled acetylated monoglycerides of modified fats), Myvacet® 507 (48.5 to 51.5 percent acetylation), Myvacet® 707 (66.5 to 69.5 percent acetylation), Myvacet® 908 (minimum of 96 percent acetylation), Myverol® (concentrated glyceryl monostearates), Acrawax®, N,N-ethylene bis-stearamide, N,N-ethylene bis-oleamide, dioctyl adipate, diisobutyl adipate, diethylene glycol dibenzoate, dipropylene glycol dibenzoate, polymeric plasticizers, such as poly(1,6-hexamethylene adipate), poly(ethylene adipate), Rucoflex®, and other compatible low molecular weight polymers and mixtures derived therefrom. Preferably, the plasticizers are nontoxic and biodegradable and/or bioderived. Any additive known for use in polymers can be used.

If desired, the copolyesters can be filled with inorganic, organic and/or clay fillers such as, for example, wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite (a crystalline calcium silicate gel), perlite, vermiculite, hydrated or unhydrated hydraulic cement particles, pumice, zeolites, kaolin, clay fillers, including both natural and synthetic clays and treated and untreated clays, such as organoclays and clays which have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, sea gel, cork, seeds, gelatins, wood flour, saw dust, agar-based materials, reinforcing agents, such as glass fiber, natural fibers, such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, recycled paper fibers, for example, from repulping operations, and mixtures derived therefrom. Fillers can increase the Young's modulus, improve the dead-fold properties, improve the rigidity of the film, coating or laminate, decrease the cost, and reduce the tendency of the film, coating, or laminate to block or self-adhere during processing or use. The use of fillers has been found to produce plastic articles which have many of the qualities of paper, such as texture and feel, as disclosed by, for example, Miyazaki, et. al., in U.S. Pat. No. 4,578,296. The additives, fillers or blend materials can be added before the polymerization process, at any stage during the polymerization process and/or in a post polymerization process. Any known filler material can be used.

Exemplary suitable clay fillers include kaolin, smectite clays, magnesium aluminum silicate, bentonite clays, montmorillonite clays, hectorite clays, and mixtures derived therefrom. The clays can be treated with organic materials, such as surfactants, to make them organophilic. Examples of suitable commercially available clay fillers include Gelwhite MAS 100, a commercial product of the Southern Clay Company, which is defined as a white smectite clay, (magnesium aluminum silicate); Claytone 2000, a commercial product of the Southern Clay Company, which is defined as a an organophilic smectite clay; Gelwhite L, a commercial product of the Southern Clay Company, which is defined as a montmorillonite clay from a white bentonite clay; Cloisite 30 B, a commercial product of the Southern Clay Company, which is defined as an organphilic natural montmorillonite clay with bis(2-hydroxyethyl)methyl tallow quarternary ammonium chloride salt; Cloisite Na, a commercial product of the Southern Clay Company, which is defined as a natural montmorillonite clay; Garamite 1958, a commercial product of the Southern Clay Company, which is defined as a mixture of minerals; Laponite RDS, a commercial product of the Southern Clay Company, which is defined as a synthetic layered silicate with an inorganic polyphosphate peptiser; Laponite RD, a commercial product of the Southern Clay Company, which is defined as a synthetic colloidal clay; Nanomers, which are commercial products of the Nanocor Company, which are defined as montmorillonite minerals which have been treated with compatibilizing agents; Nanomer 1.24 TL, a commercial product of the Nanocor Company, which is defined as a montmorillonite mineral surface treated with amino acids; "P Series" Nanomers, which are commercial products of the Nanocor Company, which are defined as surface modified montmorillonite minerals; Polymer Grade (PG) Montmorillonite PGW, a commercial product of the Nanocor Company, which is defined as a high purity aluminosilicate mineral, sometimes referred to as a phyllosilicate; Polymer Grade (PG) Montmorillonite PGA, a commercial product of the Nanocor Company, which is defined as a high purity aluminosilicate mineral, sometimes referred to as a phyllosilicate; Polymer Grade (PG) Montmorillonite PGV, a commercial product of the Nanocor Company, which is defined as a high purity aluminosilicate mineral, sometimes referred to as a phyllosilicate; Polymer Grade (PG) Montmorillonite PGN, a commercial product of the Nanocor Company, which is defined as a high purity aluminosilicate mineral, sometimes referred to as a phyllosilicate; and mixtures derived therefrom. Any clay filler known can be used. Some clay fillers can exfoliate, providing nanocomposites. This is especially true for the layered silicate clays, such as smectite clays, magnesium aluminum silicate, bentonite clays, montmorillonite clays, hectorite clays, As discussed above, such clays can be natural or synthetic, treated or not.

The particle size of the filler can be within a wide range. As one skilled within the art will appreciate, the filler particle size can be tailored to the desired use of the filled copolyester composition. It is generally preferred that the average diameter of the filler be less than about 40 microns, more preferably less than about 20 microns. However, other filler particle sizes can be used. The filler can include particle sizes ranging up to 40 mesh (US Standard) or larger. Mixtures of filler particle sizes can also be advantageously used. For example, mixtures of calcium carbonate fillers having average particle sizes of about 5 microns and of about 0.7 microns may provide better space filling of the filler within the copolyester matrix. The use of two or more filler particle sizes can allow improved particle packing. Two or more ranges of filler particle sizes can be selected such that the space between a group of large particles is substantially occupied by a selected group of smaller filler particles. In general, the particle packing will be increased whenever any given set of particles is mixed with another set of particles having a particle size that is at least about 2 times larger or smaller than the first group of particles. The particle packing density for a two-particle system will be maximized whenever the size of a given set of particles is from about 3 to about 10 times the size of another set of particles. Optionally, three or more different sets of particles can be used to further increase the particle packing density. The optimal degree of packing density depends on a number of factors such as, for example, the types and concentrations of the various components within both the thermoplastic phase and the solid filler phase; the film-forming, coating or lamination process used; and the desired mechanical, thermal and other performance properties of the final products to be manufactured. Andersen, et. al., in U.S. Pat. No. 5,527,387, discloses particle packing techniques. Filler concentrates which incorporate a mixture of filler particle sizes are commercially available by the Shulman Company under the tradename Papermatch®.

The filler can be added to the copolyester at any stage during the polymerization or after the polymerization is completed. For example, the fillers can be added with the copolyester monomers at the start of the polymerization process. This is preferable for, for example, the silica and titanium dioxide fillers, to provide adequate dispersion of the fillers within the polyester matrix. Alternatively, the filler can be added at an intermediate stage of the polymerization such as, for example, as the precondensate passes into the polymerization vessel. As yet a further alternative, the filler can be added after the copolyester exits the polymerizer. For example, the copolyester can be melt fed to any intensive mixing operation, such as a static mixer or a single- or twin-screw extruder and compounded with the filler.

As yet a further option to produce the filled sulfonated aliphatic-aromatic copolyesters, the copolyester can be combined with the filler in a subsequent postpolymerization process. Typically, such a process includes intensive mixing of the molten copolyester with the filler, which can be provided by, for example, static mixers, Brabender mixers, single screw extruders, or twin screw extruders. In a typical process, the copolyester is dried, and the dried copolyester can then be mixed with the filler. Alternatively, the copolyester and the filler can be co-fed through two different feeders. In an extrusion process, the copolyester and the filler can be fed into the back, feed section of the extruder. The copolyester and the filler can be advantageously fed into two different locations of the extruder. For example, the copolyester can be added in the back, feed section of the extruder while the filler is fed ("side-stuffed") in the front of the extruder near the die plate. The extruder temperature profile can be set up to allow the copolyester to melt under the processing conditions being used. The screw design can be selected to provide stress and, in turn, heat, to the resin as it mixes the molten copolyester with the filler. Such processes to melt mix in fillers are disclosed, for example, by Dohrer, et. al., in U.S. Pat. No. 6,359,050. Alternatively, the filler can be blended with the copolyester during the formation of films or coatings, as described below.

The sulfonated aliphatic-aromatic copolyesters can be blended with other polymeric materials, which can be biodegradable or non-biodegradable, and can be naturally derived, modified naturally derived or synthetic. Examples of blendable biodegradable materials include sulfonated aliphatic-aromatic copolyesters, such as those sold under the Biomax® tradename by the DuPont Company, aliphatic-aromatic copolyesters, such as are sold under the Eastar Bio® tradename by the Eastman Chemical Company, those sold under the Ecoflex® tradename by the BASF corporation, and those sold under the EnPol® tradename by the Ire Chemical Company; aliphatic polyesters, such as poly(1,4-butylene sucinate), (Bionolle® 1001, from Showa High Polymer Company), poly(ethylene succinate), poly(1,4-butylene adipate-co-succinate), (Bionolle® 3001, from the Showa High Polymer Company), and poly(1,4-butylene adipate) as, for example, sold by the Ire Chemical Company under the tradename of EnPol®, sold by the Showa High Polymer Company under the tradename of Bionolle®, sold by the Mitsui Toatsu Company, sold by the Nippon Shokubai Company, sold by the Cheil Synthetics Company, sold by the Eastman Chemical Company, and sold by the Sunkyon Industries Company, poly(amide esters), for example, as sold under the Bak® tradename by the Bayer Company, (these materials are believed to include the constituents of adipic acid, 1,4-butanediol, and 6-aminocaproic acid), polycarbonates, for example such as poly(ethylene carbonate) sold by the PAC Polymers Company, poly(hydroxyalkanoates), such as poly(hydroxybutyrate)s, poly(hydroxyvalerate)s, poly(hydroxybutyrate-co-hydroxyvalerate)s, for example such as sold by the Monsanto Company under the Biopol® tradename, poly(lactide-co-glycolide-co-caprolactone), for example as sold by the Mitsui Chemicals Company under the grade designations of H100J, S100, and T100, poly(caprolactone), for example as sold under the Tone(R) tradename by the Union Carbide Company and as sold by the Daicel Chemical Company and the Solvay Company, and poly(lactide), for example as sold by the Cargill Dow Company under the tradename of EcoPLA® and the Dianippon Company, and mixtures derived therefrom.

Examples of blendable nonbiodegradable polymeric materials include polyethylene, high density polyethylene, low density polyethylene, linear low density polyethylene, ultra low density polyethylene, polyolefins, poly(ethylene-co-glycidylmethacrylate), poly(ethylene-co-methyl (meth)acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propyl terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4-hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures derived therefrom.

Examples of blendable natural polymeric materials include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethycellulose, and hydroxyethylpropylcellulose, polysaccharides, alginic acid, alginates, phycocolloids, agar, gum arabic, guar gum, acacia gum, carrageenan gum, furcellaran gum, ghafti gum, psyllium gum, quince gum, tamarind gum, locust bean gum, gum karaya, xantahn gum, gum tragacanth, proteins, Zein® prolamine derived from corn, collagen, derivatives thereof such as gelatin and glue, casein, sunflower protein, egg protein, soybean protein, vegetable gelatins, gluten, and mixtures derived therefrom. Thermoplastic starch can be produced, for example, as in U.S. Pat. No. 5,362,777, which discloses the mixing and heating of native or modified starch with high boiling plasticizers, such as glycerin or sorbitol, in such a way that the starch has little or no crystallinity, a low glass transition temperature and a low water content. Any polymeric material known can be blended with the sulfonated aliphatic-aromatic copolyesters.

The polymeric material to be blended with the copolyester can be added to the copolyester at any stage during the polymerization or after the polymerization is completed. For example, the polymeric materials may be added with the copolyester monomers at the start of the polymerization process. Alternatively, the polymeric material can be added at an intermediate stage of the polymerization, for example, as the precondensate passes into the polymerization vessel. As yet a further alternative, the polymeric material can be added after the copolyester exits the polymerizer. For example, the copolyester and the polymeric material can be melt fed to any intensive mixing operation, such as a static mixer or a single- or twin-screw extruder and compounded with the copolyester.

In an alternative method to produce blends of the copolyesters and another polymeric material, the copolyester can be combined with the polymeric material in a subsequent post-polymerization process. Typically, such a process includes intensive mixing of the molten copolyester with the polymeric material, which be provided through static mixers, Brabender mixers, single screw extruders, twin screw extruders as described hereinabove with regard to the incorporation of fillers.

The sulfonated aliphatic-aromatic copolymers can be used in forming a wide variety of shaped articles. The shaped articles produced from the sulfonated aliphatic-aromatic copolyesters have improved thermal properties as compared to shaped articles produced from known sulfonated aliphatic-aromatic copolyesters. Exemplary shaped articles include film, sheets, fiber, melt blown containers, molded parts, such as cutlery, foamed parts, polymeric melt extrusion coatings onto substrates, polymeric solution coatings onto substrates. The copolyesters can be used in essentially any process known to form shaped articles.

A preferred embodiment of the present invention includes films comprising the sulfonated aliphatic-aromatic copolyesters, processes for producing the films, and articles derived therefrom. Films are generally differentiated from sheets on the basis of thickness, but there is no set industry standard as to when a film becomes a sheet. As used herein, a film is less than or equal to 0.25 mm (10 mils) thick, preferably between about 0.025 mm and 0.15 mm (1 mil and 6 mils). However, thicker films can be formed up to a thickness of about 0.50 mm (20 mils). Polymeric films have a variety of uses, such as in packaging, especially of foodstuffs, adhesives tapes, insulators, capacitors, photographic development, x-ray development and as laminates, for example. For many uses, the heat resistance of the film is important. Therefore, a higher melting point, glass transition temperature, and crystallinity are desirable to provide better heat resistance and more stable electrical characteristics, along with a rapid biodegradation rate. Further, for many applications it is desired that the films have certain barrier properties, such as, for example moisture barrier, oxygen and carbon dioxide barrier; grease resistance; tensile strength and a sufficiently high elongation at break.

The sulfonated aliphatic-aromatic copolyesters can be formed into films for use in any one of many different applications, such as food packaging, labels, dielectric insulation, or a water vapor barrier. The monomer composition of the copolyester is preferably chosen to result in a partially crystalline polymer desirable for the formation of film, wherein the crystallinity provides strength and elasticity. As first produced, the polyester is generally semi-crystalline in structure. The crystallinity increases on reheating and/or stretching of the polymer, as occurs in the production of film.

Films can be made from the sulfonated aliphatic-aromatic copolyesters using known film-forming processes. For example, thin films can be formed by dip coating as disclosed in U.S. Pat. No. 4,372,311; by compression molding as disclosed in U.S. Pat. No. 4,427,614; by melt extrusion as disclosed in U.S. Pat. No. 4,880,592; by melt blowing as disclosed in U.S. Pat. No. 5,525,281. Films are preferably formed from the sulfonated aliphatic-aromatic copolyesters by solution casting or extrusion. Extrusion is particularly preferred for formation of "endless" products, including films and sheets, which emerge as a continuous length. In extrusion, a polymeric material, whether provided as a molten polymer or as plastic pellets or granules, is fluidized and homogenized. Additives, as described above, such as thermal or UV stabilizers, plasticizers, fillers and/or blendable polymeric materials, may be added, if desired. This polymer containing optional additives is then forced through a suitably shaped die to produce a film having a desired cross-sectional shape. The extruding force can be provided by a piston or ram (ram extrusion), or by a rotating screw (screw extrusion), which operates within a cylinder in which the material is heated and plasticized and from which it is then extruded through the die in a continuous flow. Single screw, twin screw, and multi-screw extruders can be used as known. Different dies can be used to produce different products, such as blown film (formed by a blow head for blown extrusions), sheets and strips (slot dies) and hollow and solid sections (circular dies). In this manner, films of different widths and thickness can be produced. After extrusion, the polymeric film is taken up on rollers, cooled and taken off by means of suitable devices designed to prevent subsequent deformation of the film.

A film can be produced by extruding a thin layer of polymer over chilled rolls and then further drawing down the film to size by tension rolls. In the extrusion casting process, the polymer melt is conveyed from the extruder through a slot die, (T-shaped or "coat hanger" die). The die can be as wide as 10 feet and typically has thick wall sections on the final lands to minimize deflection of the lips from internal pressure. Die openings can be within a wide range, but 0.015 inch to 0.030 inch is typical. The nascent cast film may be drawn down, and thinned significantly, depending on the speed of the rolls taking up the film. The film is then solidified by cooling below the crystalline melting point or glass transition temperature. Cooling can be accomplished by passing the film through a water bath or over two or more chrome-plated chill rolls that have been cored and are water-cooled. The cast film is then conveyed though nip rolls and a slitter to trim the edges, and then wound up. In cast film, conditions can be tailored to allow a relatively high degree of orientation in the machine direction, especially at high draw down conditions and wind up speeds, and a much lower level of orientation in the transverse direction. In some embodiments, an oriented film has at least a 10 percent greater tensile strength in the machine direction than does an unoriented film of the same composition. A biaxially oriented film can have at least a 10 percent greater tensile strength in both the machine direction and the transverse direction, as compared to an unoriented film of the same composition. Alternatively, the conditions can be tailored to minimize the amount of orientation, thus providing films with essentially equivalent physical properties in the machine direction and the transverse direction. Preferably, the finished film is 0.25 mm thick or thinner.

Blown film, which is generally stronger, tougher, and can be made more rapidly than cast film, is made by extruding a tube. In producing blown film, the melt flow of molten polymer is typically turned upward from the extruder and fed through an annular die. The melt flows around a mandrel and emerges through the ring-shaped opening in the form of a tube. As the tube leaves the die, internal pressure is provided by introducing air into the die mandrel, which expands the tube from about 1.5 to about 2.5 times the die diameter and simultaneously draws the film, causing a reduction in thickness. The air contained in the tube cannot escape because it is sealed by the die on one end and by nip (or pinch) rolls on the other. Desirably, a substantially uniform air pressure is maintained to ensure uniform thickness of the film bubble. The tubular film can be cooled internally and/or externally, by directing air onto the film. Faster quenching can be accomplished by passing the expanded film about a cooled mandrel which is situated within the tube. For example, one such method using a cooled mandrel is disclosed by Bunga, et. al., in Canadian Patent 893,216. If the polymer being used to make blown film is semicrystalline, the film may become cloudy as it cools below the softening point of the polymer. Drawdown of the extrudate is not essential, but if drawn down, preferably the drawdown ratio is between 2 and 40. The drawdown ratio is the ratio of the die gap to the product of the thickness of the cooled film and the blow-up ratio. Drawdown can be induced by tension from pinch rolls. Blow-up ratio is the ratio of the diameter of the cooled film bubble to the diameter of the circular die. The blow up ratio may be as great as 4 to 5, but 2.5 are more typical. The draw down induces molecular orientation within the film in the machine direction, (i.e.; direction of the extrudate flow), and the blow-up ratio induces molecular orientation in the film in the transverse or hoop direction. The quenched tube moves upward through guiding devices into a set of pinch rolls, which flatten it. The resulting sleeve can subsequently be slit along one side, making a larger film width than could be conveniently made by the cast film method. The slit film can be further gusseted and surface-treated in line.

A blown film can be produced using more elaborate techniques, such as the double bubble, tape bubble, or trapped bubble processes. In the double bubble process, the polymeric tube is first quenched and then reheated and oriented by inflating the polymeric tube above the $T_g$ but below the crystalline melting temperature, ($T_m$), of the polyester (if the polyester is crystalline). The double bubble technique is disclosed, for example, by Pahkle in U.S. Pat. No. 3,456,044.

The conditions used to produce blown film are selected based on a variety of factors, such as, for example, the chemical composition of the polymer, the amount and type of additives, such as plasticizers, used, and the thermal properties of the polymeric composition. However, the blown film process offers certain advantages, such as the relative ease of changing the film width and caliber simply by changing the volume of air in the tube and the speed of the screw, the elimination of end effects, and the capability of providing biaxial orientation in the film as produced. Typical film thicknesses from a blown film operation are within the range of about 0.004 to 0.008 inch and the flat film width can be as wide as 24 feet or larger after slitting.

For manufacturing large quantities of film, a sheeting calendar, a machine comprising a number of heatable parallel cylindrical rollers that rotate in opposite directions and spread out the polymer and stretch it to the required thickness, can be used. A rough film is fed into the gap of the calendar. The last roller smoothes the film. If it is desired that the film have a textured surface, the last roller can provide an appropriate embossing pattern, or the film can be reheated and then passed through an embossing calendar. The calendar is followed by one or more cooling drums. Finally, the finished film is reeled up.

Extruded films can be used as starting materials for a variety of other products. For example, the film can be cut into small segments for use as feed material for further processing, such as injection molding. As a further example, the film can be laminated onto a substrate as described below. As yet a further example, the films can be metallized, using known methods. The film tubes from blown film operations can be converted to bags by, for example, heat sealing. The extrusion process can be combined with a variety of post-extrusion operations for expanded versatility. Exemplary post-forming operations include altering round to oval shapes, blowing the film to different dimensions, machining and punching, and biaxial stretching, using methods known to those skilled in the art.

A film can be made by solution casting, which produces more consistently uniform gauge film than that made by melt extrusion. Solution casting comprises dissolving polymeric granules or powder in a suitable solvent with any desired formulant, such as a plasticizer or colorant. The solution is filtered to remove dirt or large particles and cast from a slot die onto a moving belt, preferably of stainless steel, and dried, during which process the film cools. The extrudate thickness is five to ten times that of the finished film. The film may then be finished in a like manner to the extruded film. One of ordinary skill in the art can select appropriate process parameters based on the polymeric composition and process used for film formation. The solution cast film can then be post-treated as described for the extrusion cast film.

Multilayer films can also be produced, such as bilayer, trilayer, and multilayer film structures. One advantage to multilayer films is that specific properties can be tailored into the film to solve critical use needs while allowing the more costly ingredients to be relegated to the outer layers where they provide the greater needs. The multilayer film structures can be formed by coextrusion, blown film, dipcoating, solution coating, blade, puddle, air-knife, printing, Dahlgren, gravure, powder coating, spraying, or other known processes. Generally, multilayer films are produced by extrusion casting processes. In an exemplary process, the resin materials are heated in a uniform manner. The molten materials are conveyed to a coextrusion adapter that combines the molten materials to form a multilayer coextuded structure. The layered polymeric material is transferred through an extrusion die opened to a predetermined gap, commonly in the range of between about 0.05 inch (0.13 cm) and 0.012 inch (0.03 cm). The material is then drawn down to the intended gauge thickness by means of a primary chill or casting roll maintained at typically in the range of about 15 to 55° C., (60-130° F.). Typical draw down ratios range from about 5:1 to about 40:1. Multiple layers can serve as barrier layers, adhesive layers, antiblocking layers, or for other purposes. If desired, inner layers can be filled and the outer layers can be unfilled, as disclosed in U.S. Pat. Nos. 4,842,741 and 6,309,736. Production processes are well known, for example, as disclosed in U.S. Pat. Nos. 3,748,962, 4,522,203, 4,734,324, 5,261,899 and 6,309,736. For example, El-Afandi, et. al., in U.S. Pat. Nos. 5,849,374, 5,849,401, and 6,312,823, disclose compostable multilayer films with a core poly(lactide) layer and inner and outer layers of blocking reducing layers composed of, for example, aliphatic polyesters. The additional layers can contain copolyesters disclosed herein and/or other materials that are biodegradable or not biodegradable, naturally derived, modified naturally derived or synthetic. Examples of biodegradable, nonbiodegradable, and synthetic materials suitable as additional layers include materials disclosed hereinabove for use in making blends.

Regardless of how a film is formed, it can be subjected to biaxial orientation by stretching in both the machine and transverse direction after formation. The machine direction stretch is initiated in forming the film simply by rolling out and taking up the film, which stretches the film in the direction of take-up, orienting some of the fibers. Although uniaxial orientation strengthens the film in the machine direction, it allows the film to tear easily in the direction perpendicular to the orientation, because all of the fibers are oriented in one direction. Preferably, the stretching process takes place at a temperature of at least 10° C. above the glass transition temperature of the film material and preferably below the Vicat softening temperature of the film material, especially at least 10° C. below the Vicat softening point, depending on some degree to the rate of stretching.

Biaxial stretching orients the fibers parallel to the plane of the film, leaving the fibers randomly oriented within the plane of the film, which provides superior tensile strength, flexibility, toughness and shrinkability, for example, in comparison to non-oriented films. It is desirable to stretch the film along two axes perpendicular to each other. This increases tensile strength and elastic modulus in the directions of stretch. It is most desirable for the amount of stretch in each direction to be approximately equivalent, thereby providing similar properties within the film when tested from any direction. However, certain applications, such as those for which a certain amount of shrinkage or greater strength in one direction over another is required, as in labels or adhesive and magnetic tapes, uniaxial or unequal orientation of the fibers of the film may be desired.

Biaxial orientation can be obtained using any known process, on commercially available equipment. Preferred is tentering, wherein the material is stretched while heating in the transverse direction simultaneously with, or subsequent to, stretching in the machine direction.

Suitable equipment is available from Bruckner Maschenenbau of West Germany and operates, for example, by clamping on the edges of the sheet to be drawn and, at the appropriate temperature, separating the edges of the sheet at a controlled rate. Film can be fed into a temperature-controlled box, heated above its glass transition temperature and grasped on either side by tenterhooks that simultaneously exert a drawing tension (longitudinal stretching) and a widening tension (lateral stretching). Typically, stretch ratios of 3:1 to 4:1 can be employed. Alternatively, and preferably for some commercial applications, the biaxial drawing process is conducted continuously at high production rates in multistage roll drawing equipment, as available from Bruckner, wherein the drawing of the extruded film stock takes place in a series of steps between heated rolls rotating at different and increasing rates. When the appropriate combinations of draw temperatures and draw rates are employed, the monoaxial stretching is preferably from about 4 to about 20, more preferably from about 4 to about 10. Draw ratio is defined as the ratio of a dimension of a stretched film to a non-stretched film. A biaxially oriented film can further be subjected to additional drawing of the film in the machine direction, in a process known as tensilizing.

Uniaxial orientation can be obtained by stretching the film in only one direction as in the above described biaxial processes, or by directing the film through a machine direction orienter, ("MDO"), such as is commercially available from vendors such as the Marshall and Williams Company of Providence, R.I. The MDO apparatus has a plurality of stretching rollers that progressively stretch and thin the film in the machine direction.

Orientation can be enhanced in blown film operations by adjusting the blow-up ratio, (BUR), which is the ratio of the diameter of the film bubble to the die diameter. For example, it is generally preferred to have a BUR of 1 to 5 for the production of bags or wraps. However, the desired BUR can vary, depending upon the properties desired in the machine direction and the transverse direction. For a balanced film, a BUR of about 3:1 is generally appropriate. If it is desired to have a "splitty" film, which easily tears in one direction, then a BUR of 1:1 to about 1.5:1 is generally preferred.

Shrinkage can be controlled by holding the film in a stretched position and heating for a few seconds before quenching. The heat stabilizes the oriented film, which then can be forced to shrink only at temperatures above the heat stabilization temperature. Further, the film can also be subjected to rolling, calendaring, coating, embossing, printing, or any other typical finishing operations known.

Process conditions and parameters for film making by any method in the art are easily determined by a skilled artisan for any given polymeric composition and desired application. The properties exhibited by a film, such as shrinkage, tensile strength, elongation at break, impact strength, dielectric strength and constant, tensile modulus, chemical resistance, melting point, heat deflection temperature, and deadfold performance, depend on several factors, including those mentioned above, such as the polymeric composition, the method of forming the polymer, the method of forming the film, and whether the film was treated for stretch or biaxially oriented. The film properties can be further adjusted by adding certain additives and fillers to the polymeric composition, such as colorants, dyes, UV and thermal stabilizers, antioxidants, plasticizers, lubricants antiblock agents, and slip agents, as recited above. Alternatively, the sulfonated aliphatic-aromatic copolyesters can be blended with one or more other polymeric materials to improve certain characteristics, as described above.

As disclosed by Moss in U.S. Pat. No. 4,698,372, Haffner, et. al. in U.S. Pat. No. 6,045,900, and McCormack in WO 95/16562, films, especially filled films, can be formed microporous, if desired. For example, stretching a filled film can create fine pores. Microporous films can serve as a barrier to liquids and particulate matter, yet allow air and water vapor to pass through. In alternate embodiments, to enhance the printability (ink receptivity) of the surface, adhesion or other desirable characteristics, the films of can be treated by known, conventional post forming operations, such as corona discharge, chemical treatments, or flame treatment.

The films of the sulfonated aliphatic-aromatic copolyesters can be used in a wide variety of areas. For example, the films can be used as a component of personal sanitary items, such as disposable diapers, incontinence briefs, feminine pads, sanitary napkins, tampons, tampon applicators, motion sickness bags, baby pants, personal absorbent products. The films combine water barrier properties, to avoid leak through, with toughness to conform to the body and to stretch with the body movements during use. After their use, the soiled articles will biocompost rapidly when discarded appropriately.

As further examples, the films can be used as protective films for agriculture, such as mulch films, seed coverings, agriculture mats containing seeds, ("seed tapes"), garbage bags and lawn waste bags. Further exemplary uses of films containing the sulfonated aliphatic aromatic copolyesters include: adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A particularly preferred use of the films comprising the sulfonated aliphatic-aromatic copolyesters is in food packaging, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, and skin packaging. In particular, the films are suitable as wraps. Wraps are used to enclose meats, other perishable items, and especially fast food items, such as sandwiches, burgers, dessert items. Desirably, films of the sulfonated aliphatic-aromatic copolyesters used as wraps provide a good balance of physical properties, including paper-like stiffness combined with sufficient toughness so as not to tear when used to wrap a food item; good deadfold characteristics, so that once folded, wrapped or otherwise manipulated into the desired shape, a wrap maintains its shape and does not tend to spontaneously unfold or unwrap;

grease resistance, where desired; and a moisture barrier while not allowing for moisture to condense onto a food item wrapped therein. The wraps can have smooth surfaces, or textured surfaces formed, for example, by embossing, crimping, or quilting. The wraps can be filled, with, for example, inorganic particles, organic particles, such as starch, or combinations of fillers.

The films can be further processed to produce additional desirable articles, such as containers. The films can be thermoformed, for example, as disclosed, in U.S. Pat. Nos. 3,303, 628, 3,674,626, and 5,011,735. The films can be used to package foods, such as meats, by vacuum skin packaging techniques, for example, as disclosed in U.S. Pat. Nos. 3,835, 618, 3,950,919, US Re 30,009, and U.S. Pat. No. 5,011,735. The films can be laminated onto substrates, as described below.

A further preferred aspect of the present invention relates to coatings of the sulfonated aliphatic-aromatic copolyesters onto substrates, and the production processes thereof and articles derived therefrom. Coatings can be produced by coating a substrate with polymer solutions, dispersions, latexes, and emulsions of the copolyesters by rolling, spreading, spraying, brushing, or pouring processes, followed by drying, by coextruding the copolyesters with other materials, powder coating onto a preformed substrate, or by melt/extrusion coating a preformed substrate with the copolyesters. The substrate can be coated on one side or on both sides. The polymeric coated substrates have a variety of uses, such as in packaging, especially of foodstuffs, and as disposable cups, plates, bowls and cutlery. For some uses, the heat resistance of the coating is an important property. Therefore, a higher melting point, glass transition temperature, and crystallinity level are desirable to provide better heat resistance, along with a rapid biodegradation rate. Further, it is desired that the coatings provide good barrier properties for moisture, grease, oxygen, and carbon dioxide, and have good tensile strength and a high elongation at break. Coatings can be made from the polymer using known processes. For example, thin coatings can be formed by dipcoating as disclosed in U.S. Pat. Nos. 4,372,311 and 4,503,098; extrusion onto substrates, as disclosed, for example, in U.S. Pat. Nos. 5,294,483, 5,475,080, 5,611,859, 5,795,320, 6,183,814, and 6,197,380; or by blade, puddle, air-knife, printing, Dahlgren, gravure, powder coating, spraying, or other processes. The coatings can be of any desired thickness, but preferably, the polymeric coating is 0.25 mm (10 mils) thick or less, more preferably between about 0.025 mm and 0.15 mm (1 mil and 6 mils). However, thicker coatings can be formed, up to a thickness of about 0.50 mm (20 mils) or greater.

Various substrates can be coated directly with a film. However, coatings of the copolyesters are preferably formed by solution, dispersion, latex, or emulsion casting, powder coating, or extrusion onto a preformed substrate.

Solution casting of a coating onto a substrate produces more consistently uniform gauge coatings than melt extrusion. Solution casting comprises dissolving polymeric particles such as granules or powder in a suitable solvent with any desired formulant, such as a plasticizer, filler, blendable polymeric material, or colorant. The solution is filtered to remove dirt or large particles and cast from a slot die onto a moving preformed substrate, and dried, whereupon the coating cools. The extrudate thickness is five to ten times that of the finished coating. The coating can then be finished as is an extruded coating. Polymeric dispersions and emulsions can be coated onto substrates by equivalent processes. Coatings can be applied to textiles, nonwovens, foil, paper, paperboard, and other sheet materials by continuously operating spread-coating machines. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, the polymeric solution, emulsion, or dispersion can be sprayed, brushed, rolled or poured onto the substrate. For example, Potts, in U.S. Pat. Nos. 4,372,311 and 4,503,098, discloses coating water-soluble substrates with solutions of water-insoluble materials, and U.S. Pat. No. 3,378,424 discloses processes for coating a fibrous substrate with an aqueous polymeric emulsion.

In a powder coating process, the polymer is coated onto a substrate in the form of a powder with a fine particle size. The substrate to be coated can be heated to above the fusion temperature of the polymer and the substrate dipped into a bed of the powdered polymer fluidized by the passage of air through a porous plate. The fluidized bed is typically not heated. A layer of the polymer adheres to the hot substrate surface and melts to provide the coating. Coating thicknesses can be in the range of about 0.005 inch to 0.080 inch, (0.13 to 2.00 mm). Other powder coating processes include spray coating, wherein the substrate is not heated until after it is coated, and electrostatic coating. For example, paperboard containers can be electrostatically spray-coated with a thermoplastic polymer powder, as disclosed in U.S. Pat. Nos. 4,117,971, 4,168,676 4,180,844, 4,211,339, and 4,283,189. The containers are then heated, causing the polymeric powder to melt to form the laminated polymeric coating.

Metal articles of complex shapes can also be coated with the polymeric film by a whirl sintering process. The articles, heated to above the melting point of the polymer, are introduced into a fluidized bed of powdered polymer wherein the polymer particles are held in suspension by a rising stream of air, thus depositing a coating on the metal by sintering. Coatings of the polymers of the present invention can be applied by spraying molten, atomized polymer onto a substrate, such as paperboard, as disclosed in, for example, U.S. Pat. Nos. 5,078,313, 5,281,446, and 5,456,754.

Coatings of the sulfonated aliphatic aromatic copolyesters are preferably formed by melt or extrusion coating processes. Extrusion is particularly preferred for formation of "endless" products, such as coated paper and paperboard, which emerge as a continuous length. Extrusion coating of polyesters onto paperboard is known. For example, Kane, in U.S. Pat. No. 3,924,013, discloses the formation of ovenable trays mechanically formed from paperboard previously laminated polyester. Chaffey, et. al., in U.S. Pat. No. 4,836,400, discloses the production of cups formed from paper stock which has been coated with a polymer on both sides. Beavers, et. al., in U.S. Pat. No. 5,294,483, discloses the extrusion coating of certain polyesters onto paper substrates. As a further example of extrusion coating, wires and cable can be sheathed directly with polymeric films extruded from oblique heads.

Calendaring processes can also be used to produce polymeric laminates onto substrates. Calendars generally consist of two, three, four, or five hollow rolls arranged for steam heating or water cooling. Typically, a polymer to be calendared is softened, for example in ribbon blenders, such as a Banbury mixer. Other components can be mixed in, such as plasticizers. The softened polymeric composition is then fed to the roller arrangement and is squeezed into the form of films. If desired, thick sections can be formed by applying one layer of polymer onto a previous layer (double plying). The substrate, such as, for example, textile, nonwoven fabric or paper, is fed through the last two rolls of the calendar so that the resin film is pressed into the substrate. The thickness of the laminate is determined by the gap between the last two rolls of the calendar. The surface can be made glossy, matt, or embossed. The laminate is then cooled and wound up on rolls. Multiple polymer layers can be coated onto a substrate, such as bilayer, trilayer, and multilayer film structures. The coating of multiple layers onto substrates offers advantages including those described above generally with regard to multilayer structures. Formation of multilayer coatings can be carried out in processes such as those described above for the formation of multilayer structures. Examples of suitable biodegradable, nonbiodegradable and natural polymeric materials suitable for use in forming multilayer coatings containing the sulfonated aliphatic-aromatic copolyesters are described hereinabove for use in making films.

Examples of suitable substrates for coating with one or more layers containing the sulfonated aliphatic-aromatic copolyesters and optionally other polymers include articles composed of paper, paperboard, cardboard, fiberboard, cellulose, such as Cellophane®, starch, plastic, polystyrene foam, glass, metal, for example; aluminum or tin cans, metal foils, polymeric foams, organic foams, inorganic foams, organic-inorganic foams, and polymeric films. Preferred are biodegradable substrates, such as paper, paperboard, cardboard, cellulose, starch and biobenign substrates such as inorganic and inorganic-organic foams.

Polymeric films suitable as substrates can include the sulfonated aliphatic-aromatic copolyesters and/or other materials, which may be biodegradable or not biodegradable. The materials may be naturally derived, modified naturally derived or synthetic. Examples of such materials are disclosed hereinabove with regard the formation of multilayer structures and films. Organic foams, such as derived from expanded starches and grains, can be coated with the copolyesters. Such materials are disclosed, for example, in U.S. Pat. Nos. 3,137,592, 4,673,438, 4,863,655, 5,035,930, 5,043,196, 5,095,054, 5,300,333, 5,413,855, 5,512,090, and 6,106,753. Specific examples of the materials include EcoFoam®, a product of the National Starch Company of Bridgewater, N.J., and EnviroFil®, a product of the EnPac Company, a DuPont-Con Agra Company. Particularly preferred organic-inorganic foams are the cellular highly inorganically filled with, for example, calcium carbonate, clays, cement, or limestone; those having a starch-based binder such as for example, potato starch, corn starch, waxy corn starch, rice starch, wheat starch, tapioca, and those containing a small amount of fiber, as disclosed, for example, by Andersen, et. al., in U.S. Pat. No. 6,030,673. Such foams can be produced by mixing the ingredients together, such as limestone, potato starch, fiber and water, to form a batter. The substrate is formed by pressing the batter between two heated molds. The water contained within the batter is turned to steam, raising the pressure within the mold and foaming a foamed product. Products produced in such a process are commercially available by the EarthShell Packaging Company, and include 9-inch plates, 12-ounce bowls and hinged-lid sandwich and salad containers ("clam shells").

To enhance the coating process, the substrates can be treated by known, conventional post forming operations, such as, for example, corona discharge; chemical treatments, such as primers; flame treatments; and adhesives. The substrate layer can be primed with, for example, an aqueous solution of polyethyleneimine, such as Adcote® 313 polyethyleneimine, or a styrene-acrylic latex, or may be flame treated, as disclosed in U.S. Pat. Nos. 4,957,578 and 5,868,309. The substrate can be coated with an adhesive, using extrusion or other known techniques. Any known adhesives suitable for applying coatings can be used. Specific examples of adhesives that can be used include: glue, gelatine, caesin, starch, cellulose esters, aliphatic polyesters, poly(alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly (ethylene-co-propylene), poly(ethylene-co-1-butene), poly (ethylene-co-1-pentene), poly(styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), non-sulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B. F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and Jagotex® KEA 5040 by the Jager Company; Hycar® 26084, Hycar® 26091, Hycar® 26315, Hycar® 26447, Hycar® 26450, and Hycar® 26373 by the B. F. Goodrich Company; Rhoplex® AC-264, Rhoplex® HA-16, Rhoplex® B-60A, Rhoplex® AC-234, Rhoplex) E-358, and Rhoplex® N-619 by the Rohm & Haas Company), silanated anionic acrylate-styrene polymer dispersions, (such as Acronal® S-710 by the BASF Corporation and Texigel® 13-057 by Scott Bader Inc.), anionic acrylate-styrene dispersions, (such as Acronal(®296D, Acronal® NX 4786, Acronal® S-305D, Acronal®D S400, Acronal® S-610, Acronal® S-702, Acronal® S-714, Acronal® S-728, and Acronal® S-760 by the BASF Corporation; Carboset® CR-760 by the B. F. Goodrich Company; Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13-57 Texigel® 13-034, and Texigel® 13-031 by Scott Bader Inc.; and Vancryl® 954, Vancryl® 937 and Vancryl® 989 by the Air Products & Chemicals Company), anionic acrylate-styrene-acrylonitrile dispersions, (such as Acronal® S 886S, Acronal® S 504, and Acronal® DS 2285 X by the BASF Corporation), acrylate-acrylonitrile dispersions, (such as Acronal® 35D, Acronal® 81 D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrrolidone/styrene copolymer emulsions, (such as Polectron® 430 by ISP Chemicals), carboxylated and noncarboxylated vinyl acetate ethylene dispersions, (such as Airflex® 420, Airflex® 421, Airflex® 426, Airflex® 7200, and Airflex® A-7216 by Air Products and Chemicals Inc. and Dur-o-set® E150 and Dur-o-set® E-230 by ICI), vinyl acetate homopolymer dispersions, (such as Resyn® 68-5799 and Resyn® 25-2828 by ICI), polyvinyl chloride emulsions, (such as Vycar® 460×24, Vycar® 460×6 and Vycar® 460×58 by the B. F. Goodrich Company), poly-vinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid® 121RC, Micromid® 141L, Micromid® 142LTL, Micromid® 143LTL, Micromid® 144LTL, Micromid® 321 RC, and Micromid® 632HPL by the Union Camp Corporation), anionic carboxylated or noncarboxylated acrylonitrile-butadiene-styrene emulsions and acrylonitrile emulsions, (such as Hycar® 1552, Hycar® 1562×107, Hycar® 1562×117 and Hycar® 1572×64 by B. F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez® 9191, Escorez® 9241, and Escorez® 9271 by Exxon), styrene-maleic anhydrides, (such as SMA® 1440 H and SMA® 1000 by AtoChem), and mixtures derived therefrom. Preferably, the substrate is coated with a biodegradable adhesion binder layer with, for example, glue, gelatine, casein, or starch.

Adhesives can be applied, for example, in melt processes or using conventional solution, emulsion, dispersion or other coating processes. For example, U.S. Pat. No. 4,343,858, discloses a coated paperboard formed by the coextrusion of a polyester top film and an intermediate layer of an ester of acrylic acid, methacrylic acid, or ethacrylic acid, onto paperboard. U.S. Pat. No. 4,455,184 discloses a process to coextrude a polyester layer and a polymeric adhesive layer onto a paperboard substrate; Fujita, et. al., in U.S. Pat. No. 4,543,280, discloses the use of adhesives in the extrusion coating of polyester onto ovenable paperboard; and Huffman, et. al., in U.S. Pat. No. 4,957,578, discloses the extrusion of a polyester layer on top of a polyethylene coated paperboard. The polyethylene layer may be corona discharged or flame treated to promote adhesion. They further disclose the direct formation of the structure through coextrusion of the polyethylene layer on top of the paperboard with the polyester on top of the polyethylene with a coextruded tie layer of Bynel® adhesive between the polyethylene layer and the polyester layer. One of ordinary skill in the art can identify appropriate process parameters based on the polymeric composition and process used for the coating formation and the desired application.

The properties exhibited by a coating, such as shrinkage, tensile strength, elongation at break, impact strength, dielectric strength and constant, tensile modulus, chemical resistance, melting point, and heat deflection temperature, depend on a variety of factors including those discussed hereinabove with regard to films, such as the polymeric composition, the method of forming the polymer, the method of forming the coating, and whether the coating was oriented during manufacture. The coating properties can be adjusted by adding additives and/or fillers to the polymeric composition, such as colorants, dyes, UV and thermal stabilizers, antioxidants, plasticizers, lubricants antiblock agents, and slip agents, as recited above. Alternatively, the sulfonated aliphatic-aromatic copolyesters can be blended with one or more other polymeric materials to improve certain characteristics, as described above.

The substrates can be formed into articles prior to coating or after coating. For example, containers can be produced from flat, coated paperboard by press forming, by vacuum forming, or by folding and adhering them into the final desired shape. Coated, flat paperboard stock can be formed into trays by the application of heat and pressure, as disclosed, for example, in U.S. Pat. No. 4,900,594. Vacuum forming into containers for foods and beverages, is disclosed within U.S. Pat. No. 5,294,483. Articles that can be made from the coated substrates include, for example, cutlery, flower pots, mailing tubes, light fixtures, ash trays, game boards, food containers, fast food containers, cartons, boxes, milk cartons, fruit juice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging platters, disposable single use liners which can be utilized with containers such as cups or food containers, substantially spherical objects, bottles, jars, crates, dishes, medicine vials, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

Water-resistant polymer coated paper and paperboard are commonly used in packaging materials for foodstuffs and as disposable containers. Coating polymers and multilamellar coating structures including the same can impart to a package oxygen, water vapor, and aroma tightness for preservation of a product packaged therein.

Coatings comprising the sulfonated aliphatic-aromatic copolyesters can be used in a wide variety of areas. For example, the coatings can be used as a component of personal sanitary items, such as disposable diapers, incontinence briefs, feminine pads, sanitary napkins, tampons, tampon applicators, motion sickness bags, baby pants, personal absorbent products. Coatings comprising the sulfonated aliphatic-aromatic copolyesters combine excellent water barrier properties, to avoid leak through, with excellent toughness and the ability to easily conform to the body and to stretch with the body movements during use. After their use, the soiled articles will biocompost rapidly when discarded appropriately.

As further examples, coatings containing the sulfonated aliphatic-aromatic copolyesters can be used as protective films for agriculture, such as mulch films, seed coverings, agriculture mats containing seeds, ("seed tapes"), garbage and lawn waste bags. Further exemplary applications in which the coatings can be used include: adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys and wipes.

A particularly preferred use of coatings comprising the sulfonated aliphatic-aromatic copolyesters is in food packaging, especially fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, skin packaging, hinged lid sandwich and salad containers, ("clam shells"). A further preferred end use for the coatings is in wraps. Wraps can be, for example, in the form of a polymeric coated paper. Wraps can be used to enclose meats, other perishable items, and especially fast food items, such as sandwiches, burgers, and dessert items. Desirably, the coatings of the present invention used as coated wraps provide a balance of properties, as disclosed hereinabove with regard to films. The wraps can have smooth surface or a textured surface, and can be filled, with, for example, inorganic particles, organic particles, such as starch, or combinations of organic and inorganic fillers.

A further preferred aspect of the present invention includes laminates of the sulfonated aliphatic-aromatic copolyesters onto substrates, and the production processes thereof and articles derived therefrom. A laminate is differentiated from a coating in that in lamination, a preformed film is attached to a substrate. The films comprising the sulfonated aliphatic-aromatic copolyesters, prepared as described above, be laminated onto a wide variety of substrates using known processes such as, for example, thermoforming, vacuum thermoforming, vacuum lamination, pressure lamination, mechanical lamination, skin packaging, and adhesion lamination. Depending on the intended use of the polyester laminated substrate, the substrate can be laminated on one side or on both sides. The substrate can be formed into the final use shape, such as in the form of a plate, cup, bowl, tray before lamination, or can be laminated while in an intermediate shape still to be formed, such as a sheet or film. The film can be attached to the substrate by the application of heat and/or pressure, as with, for example heated bonding rolls. The laminate bond strength or peel strength can generally be enhanced by the use of higher temperatures and/or pressures. Adhesives that can be used include hot melt adhesives and solvent based adhesives. To enhance the lamination process, the films and/or the substrates can be treated by known, conventional post forming operations, such as corona discharge, chemical treatments, such as primers, flame treatments, as previously described. For example, U.S. Pat. No. 4,147,836 describes subjecting a paperboard to a corona discharge to enhance the lamination process with a poly(ethylene terephthalate) film. For example, Quick, et. al., in U.S. Pat. No. 4,900,594, disclose the corona treatment of a polyester film to aid in the lamination to paperstock with adhesives; Schirmer, in U.S. Pat. No. 5,011,735, discloses the use of corona treatments to aid the adhesion between various blown films; U.S. Pat. Nos. 5,679,201 and 6,071,577, disclose the use of flame treatments to aid in the adhesion within polymeric lamination processes; and Sandstrom, et. al, in U.S. Pat. No. 5,868,309, discloses the use of paperboard substrate primer consisting of certain styrene-acrylic materials to improve the adhesion with polymeric laminates.

Processes for producing polymeric coated or laminated paper and paperboard substrates for use as containers and cartons are known and are disclosed, for example, in U.S. Pat. Nos. 3,863,832, 3,866,816, 4,337,116, 4,456,164, 4,698,246, 4,701,360, 4,789,575, 4,806,399, 4,888,222, and 5,002,833. Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. The lamination of films onto nonwoven fabrics is disclosed within U.S. Pat. Nos. 6,045,900 and 6,309,736.

Films containing the sulfonated aliphatic-aromatic copolyesters can be passed through heating and pressure/nip rolls to be laminated onto flat substrates. More commonly, the films are laminated onto substrates utilizing processes derived from thermoforming, in which the films are laminated onto substrates by, for example, vacuum lamination, pressure lamination, blow lamination, or mechanical lamination. When the films are heated, they soften and can be stretched onto a substrate of any given shape. Processes to adhere a polymeric film to a preformed substrate are known, for example, as disclosed in U.S. Pat. No. 2,590,221. In vacuum lamination, the film can be clamped or simply held against the substrate and then heated until it becomes soft. A vacuum is then applied, typically through porous substrates or designed-in holes, causing the softened film to mold into the contours of the substrate and laminate onto the substrates. The laminate is then cooled, and the vacuum can be maintained or not during the cooling process.

For substrate shapes requiring a deep draw, such as cups, deep bowls, boxes, and cartons, a plug assist can be utilized. In such substrate shapes, the softened film tends to thin out significantly before it reaches the base or bottom of the substrate shape, leaving only a thin and weak laminate on the bottom of the substrate shape. A plug assist is any type of mechanical helper that carries more film stock toward an area of the substrate shape where the lamination would otherwise be too thin. Plug assist techniques can be adapted to vacuum and pressure lamination processes.

Vacuum lamination processes of films onto preformed substrates is known, and is disclosed, for example in U.S. Pat. Nos. 4,611,456 and 4,862,671. For example, Knoell, in U.S. Pat. No. 3,932,105, discloses processes for the vacuum lamination of a film onto a folded paperboard carton. Vacuum lamination processes are disclosed, for example, by Lee, et. al., in U.S. Pat. No. 3,957,558; and Foster, et. al, in U.S. Pat. No. 4,337,116. Plug assisted, vacuum lamination processes are disclosed, for example, by Wommelsdorf, et. al., in U.S. Pat. No. 4,124,434, and Faller, in U.S. Pat. Nos. 4,200,481 and 4,257,530. Pressure lamination is another useful process. In pressure lamination, the film is clamped, heated until it softens, and then forced into the contours of the substrate to be laminated through air pressure being applied to the side of the film opposite to the substrate. Exhaust holes may be present to allow the trapped air to escape, or in the more common situation, the substrate is porous to air and the air simply escapes through the substrate. The air pressure can be released once the laminated substrate cools and the film solidifies. Pressure lamination tends to allow a faster production cycle, improved part definition and greater dimensional control over vacuum lamination. Pressure lamination of films onto preformed substrates is disclosed, for example, in U.S. Pat. Nos. 3,657,044 and 4,862,671, 4,092,201.

Mechanical lamination includes any lamination method that does not use vacuum or air pressure. In mechanical lamination, the film is heated and then mechanically applied to the substrate. Mechanical lamination can include the use of molds or pressure rolls.

Suitable substrates for the present invention may include articles composed of paper, paperboard, cardboard, fiberboard, cellulose, such as Cellophane® cellulose, starch, plastic, polystyrene foam, glass, metal, for example; aluminum or tin cans, metal foils, polymeric foams, organic foams, inorganic foams, organic-inorganic foams, and polymeric films. Preferred are biodegradable substrates, such as paper, paperboard, cardboard, cellulose, and starch and biobenign substrates such as inorganic and inorganic-organic foams.

Polymeric films which are suitable as substrates can contain the sulfonated aliphatic-aromatic copolyesters and/or other polymeric materials, which may be biodegradable or not biodegradable. The materials may be naturally derived, modified naturally derived or synthetic.

Examples of biodegradable, nonbiodegradable, and synthetic materials suitable as additional layers include materials disclosed hereinabove for use in making blends.

Organic foams, such as derived from expanded starches and grains, may be used as substrates for lamination. Such materials are disclosed, for example, in U.S. Pat. Nos. 3,137, 592, 4,673,438, 4,863,655, 5,035,930, 5,043,196, 5,095,054, 5,300,333, 5,413,855, 5,512,090, and 6,106,753. Specific examples of suitable foams include EcoFoam® foam, a product of the National Starch Company of Bridgewater, N.J., which is a hydroxypropylated starch product, and EnviroFil® foam, a product of the EnPac Company, a DuPont-ConAgra Company.

Particularly preferred organic-inorganic foams are cellular foams highly inorganically filled with, for example, calcium carbonate, clays, cement, or limestone, and having a starch-based binder, such as, for example, potato starch, corn starch, waxy corn starch, rice starch, wheat starch, or tapioca, and a small amount of fiber, as disclosed, for example, by Andersen, et. al., in U.S. Pat. No. 6,030,673. Products made from such foams include 9-inch plates, 12-ounce bowls and hinged-lid sandwich and salad containers, ("clam shells"), and are commercially available from the EarthShell Packaging Company.

Substrates can be formed into their final shape prior to lamination, using known processes. For example, for molded pulp substrates, a "precision molding", "die-drying", and "close-drying" process may be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. Nos. 2,183,869, 4,337,116, and 4,456,164. Precision molded pulp articles can be dense, hard and boardy, with a smooth, hot-ironed surface finish. Disposable paper plates produced by such processes have been sold under the "Chinet" tradename by the Huhtamaki Company.

Molded pulp substrates can be produced using the commonly known "free-dried" or "open-dried" processes. The free-dried process includes molding fibrous pulp from an aqueous slurry against a screen-covered, open-face suction mold to a pre-form in essentially the final molded shape and then drying the damp pre-from in a free space, such as by placing it on a conveyor, and moving it slowly through a heated drying oven. The molded pulp articles generally have a non-compacted consistency, resilient softness, and an irregular fibrous feel and appearance. Molded pulp substrates can also be produced by being "after pressed" after being formed in a free-dried process, for example, as disclosed in U.S. Pat. No. 2,704,493, or using conventional processes as disclosed, for example, in U.S. Pat. No. 3,185,370.

The laminated substrates may be converted to the final shape using known processes, such a press forming or folding up. Such processes are disclosed, for example in U.S. Pat. Nos. 3,924,013, 4,026,458, 4,456,164, and 4,900,594.

As disclosed above, adhesives can be applied to the film, to the substrate or to the film and the substrate to enhance the bond strength of the laminate. Adhesive lamination of films onto preformed substrates is known, and is disclosed, for example, by Schmidt, in U.S. Pat. No. 4,130,234,; by Dropsy in U.S. Pat. No. 4,722,474;Quick, et. al., in U.S. Pat. No. 4,900,594; Martini, et. al., in U.S. Pat. No. 5,110,390; and Gardiner, in U.S. Pat. Nos. 5,679,201 and 6,071,577.

Adhesive can be applied to the film using conventional coating technologies, or by coextrusion, or the substrate and/or film can be coated with adhesives. Specific examples of adhesives suitable for use in applying laminates of the sulfonated aliphatic-aromatic copolyesters are disclosed hereinabove.

Laminates containing the sulfonated aliphatic-aromatic copolyesters can be used in a wide variety of areas. For example, the laminates can be used as a component of personal sanitary items, such as disposable diapers, incontinence briefs, feminine pads, sanitary napkins, tampons, tampon applicators, motion sickness bags, baby pants, personal absorbent products. The laminates of the present invention combine excellent water barrier properties, to avoid leak through, with excellent toughness to easily conform to the body and to stretch with the body movements during use. After their use, the soiled articles will biocompost rapidly when discarded appropriately. As further examples, the laminates can be used as protective films for agriculture, such as mulch films, seed coverings, agriculture mats containing seeds, ("seed tapes"), garbage and lawn waste bags, adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A particularly preferred use of the laminates comprising the sulfonated aliphatic-aromatic copolyesters is in food packaging, especially fast food packaging. Specific examples of food packaging uses include 10 fast food wrappers, stretch wrap films, hermetic seals, food bags, snack bags, containers for frozen food, drinking cups or goblets, heat-sealed cartons for liquid food stuffs, disposable dishes, disposable containers, grocery bags, cups, trays, cartons, boxes, bottles, crates, food packaging films, blister pack wrappers, skin packaging, hinged lid sandwich and salad containers, ("clam shells"), In cups intended for hot drinks, it is preferable to have the polyester laminate, which is preferably water-tight, only on the inner surface. On the other hand, for cups intended for cold drinks, it is preferable to have the polyester coating on both the inner and outer surface of the cup to avoid water condensing on the outer surface of the cup. For heat-sealed cartons, it is preferable that the polyester coating be on both the inner and outer surface of the container.

A specifically preferred end use for the laminates of the present invention is in making wraps. Wraps can be, for example, in the form of a polymeric laminated paper. Wraps can be used to enclose meats, other perishable items, and especially fast food items, such as sandwiches, burgers, dessert items, Desirably, the wraps combine a good balance of physical properties, including paper-like stiffness combined with sufficient toughness so as not to tear when used to wrap an item, good deadfold characteristics, so that once folded, wrapped or otherwise manipulated into the desired shape, the wraps maintain their shape and not tend to spontaneously unfold or unwrap, grease resistance, where desired, and a balance of moisture barrier while not allowing for moisture to condense onto the, for example, sandwich. The wraps can have smooth surface, or a textured surface formed, for example, by embossing, crimping, or quilting. The wraps can be filled with organic and/or inorganic fillers. For some applications it is preferred that the wraps resemble paper in feel and appearance.

The sulfonated aliphatic-aromatic copolyesters can be formed into sheets. As the term "sheet" is used herein, a sheet has a thickness greater than about 0.25 mm (10 mils), preferably between about 0.25 mm and 25 mm, more preferably from about 2 mm to about 15 mm, and even more preferably from about 3 mm to about 10 mm. In a preferred embodiment, the sheets containing the sulfonated aliphatic-aromatic copolyesters have a thickness sufficient to cause the sheet to be rigid, which generally occurs at about 0.50 mm and greater. However, sheets greater than 25 mm, and thinner than 0.25 mm can be formed. Polymeric sheets have a variety of uses, such as in signage, glazings, thermoforming articles, displays and display substrates. For many uses, the heat resistance of a sheet is an important factor. Therefore, a higher melting point, glass transition temperature, and crystallinity level are desirable to provide better heat resistance and greater stability. Further, it is desired that the sheets have ultraviolet and scratch resistance, good tensile strength, high optical clarity, and good impact strength, particularly at low temperatures.

The sulfonated aliphatic-aromatic copolyesters can be formed into sheets directly from the polymerization melt. In the alternative, the copolyesters can be formed into an easily handled shape (such as pellets) from the melt, which can then be used to form a sheet. The sheets can be used for forming signs, glazings (such as in bus stop shelters, sky lights or recreational vehicles), displays, automobile lights and in thermoforming articles, for example.

Sheets can be formed using known processes, such as extrusion, solution casting or injection molding. The parameters for such processes can be easily determined by one of ordinary skill in the art depending upon viscosity characteristics of the copolyester and the desired thickness of the sheet. In preferred embodiments, sheets containing the copolyesters are formed by either solution casting or extrusion. Extrusion is particularly preferred for formation of "endless" products, such as films and sheets, which emerge as a continuous length. For example, PCT applications WO 96/38282 and WO 97/00284, disclose the formation of crystallizable sheets by melt extrusion.

Extrusion processes are disclosed hereinabove in connection with the formation of films; such processes can also be used in forming sheets. After extrusion, the polymeric sheet is taken up on rollers, cooled and taken off using devices designed to prevent subsequent deformation of the sheet. Using extruders as known, a sheet can be produced by extruding a thin layer of polymer over chilled rolls and then further drawing down the sheet to size (>0.25 mm) by tension rolls. Preferably, the finished sheet is greater than 0.25 mm thick. For manufacturing large quantities of sheets, a sheeting calendar is employed. The use of a calendar is disclosed hereinabove, in connection with the formation of films.

Extrusion can be combined with a variety of post-extruding operations for expanded versatility. Exemplary post-forming operations include altering round to oval shapes, stretching the sheet to different dimensions, machining and punching, and biaxial stretching. Polymeric sheets containing the sulfonated aliphatic-aromatic copolyesters can be combined with other polymeric materials during extrusion and/or finishing to form laminates or multilayer sheets with improved characteristics, such as water vapor resistance. A multilayer or laminate sheet can be made by any method known, and can have as many as five or more separate layers joined together by heat, adhesive and/or tie layer, as known.

Sheets can also be made by solution casting, which produces more consistently uniform gauge sheet than melt extrusion. Solution casting comprises dissolving polymeric material in the form of, for example, granules or powder in a suitable solvent with any desired formulants, such as a plasticizer or colorant. The solution is filtered to remove dirt or large particles and cast from a slot die onto a moving belt, preferably of stainless steel, dried, whereon the sheet cools. The extrudate thickness is five to ten times that of the finished sheet. The sheet can then be finished using methods used for finishing extruded sheet. As a further alternative, sheets and sheet-like articles, such as discs, can be formed by injection molding using known processes. One of ordinary skill in the art can identify appropriate process parameters, based on the polymeric composition and process used for sheet formation.

Regardless of how the sheet is formed, it can be subjected to biaxial orientation, as disclosed hereinabove for the formation of oriented films. Biaxially stretched sheets are preferred for certain uses where uniform sheeting is desired.

The properties exhibited by a sheet are determined by a variety of factors, including the polymeric composition, the method of forming the polymer, the method of forming the sheet, and whether the sheet was treated for stretch or biaxially oriented. Properties affected by such factors include shrinkage, tensile strength, elongation at break, impact strength, dielectric strength and constant, tensile modulus, chemical resistance, melting point, and heat deflection temperature. Sheet properties can be further adjusted by adding certain additives and fillers to the polymeric composition, such as colorants, dyes, UV and thermal stabilizers, antioxidants, plasticizers, lubricants antiblock agents, and slip agents, as recited above. Alternatively, the sulfonated aliphatic-aromatic copolyesters can be blended with one or more other polymers, such as starch, to improve certain characteristics. Other polymers can be added to change such characteristics as air permeability, optical clarity, strength and/or elasticity.

The sheets can be thermoformed by any known method into any desirable shape, such as for covers, skylights, shaped greenhouse glazings, displays, and food trays. The thermoforming is accomplished by heating the sheet to a sufficient temperature and for sufficient time to soften the copolyester so that the sheet can be easily molded into the desired shape. In this regard, one of ordinary skill in the art can determine the optimal thermoforming parameters depending upon the viscosity and crystallization characteristics of the polyester sheet.

The sulfonated aliphatic-aromatic copolyesters can be used in making plastic containers. Plastic containers are widely used for foods and beverages, and also for non-food materials. Such containers can be made using known processes, such as extrusion, injection molding, injection blow molding, rotational molding, thermoforming of a sheet, and stretch-blow molding. Preferably, containers made from the sulfonated aliphatic-aromatic copolyesters are made by stretch-blow molding, which is generally used in the production of poly(ethylene terephthalate) (PET) containers, such as bottles. Cold parison methods, in which a preformed parison (generally made by injection molding) is taken out of the mold and then subjected to stretch blow molding in a separate step, are particularly useful. Known hot parison methods can also be used, wherein a hot parison is immediately subjected to stretch blow molding in the same equipment without complete cooling after injection molding to make the parison. The parison temperature is determined based on the composition of the polymer. Generally, parison temperatures in the range from about 90° C. to about 160° C. are useful. The stretch blow molding temperature also depends on the polymer composition, but a mold temperature of about 80° C. to about 150° C. is generally useful.

Containers made from the copolyesters can have any shape desirable, including narrow-mouth bottles and wide-mouth bottles having threaded tops and a volume of about 400 mL to about 3 liters, although smaller and larger containers can be formed. The containers can be used in standard cold fill applications. Some compositions of the copolyesters are suitable for hot fill applications. The containers are suitable for foods and beverages, and other solids and liquids. The containers are generally clear and transparent, but can be modified to have color or to be opaque, if desired, by adding colorants or dyes, or by causing crystallization of the polymer, which results in opaqueness.

The sulfonated aliphatic-aromatic copolyesters can also be formed into fibers. The term "fibers" as used herein includes continuous monofilaments, non-twisted or entangled multifilament yarns, staple yarns, spun yarns, and non-woven materials. Such fibers may be used to form uneven fabrics, knitted fabrics, fabric webs, or any other fiber-containing structures, such as tire cords. Polyester fibers are produced in large quantities for use in a variety of applications. In particular, polyester fibers are desirable for use in textiles, especially in combination with natural fibers such as cotton and wool. Clothing, rugs, and other items can be made from the fibers. Further, polyester fibers are desirable for use in industrial applications due to their elasticity and strength. In particular, they are used to make articles such as tire cords and ropes.

The fibers can be made using conventional processes known for use in making synthetic fibers. Generally, such processes include spinning and drawing the polymer into a filament, which is then formed into a yarn by winding many filaments together. The fibers are often treated mechanically and/or chemically to impart desirable characteristics such as strength, elasticity, heat resistance, hand (feel of fabric), depending on the end product to be made from the fibers. Melt spinning is generally preferred for making polyester fibers.

For making fibers, the monomer composition of the sulfonated aliphatic-aromatic copolyesters is preferably chosen to result in a partially crystalline polymer. The crystallinity is desirable for the formation of fibers, providing strength and elasticity. As first produced, the polyester is mostly amorphous in structure. In preferred embodiments, the polyester polyester readily crystallizes on reheating and/or extension of the polyester.

Melt spinning includes heating the polymer to form a molten liquid, or melting the polymer against a heated surface. The molten polymer is forced through a spinneret with a plurality of fine holes. Upon contact with air or a non-reactive gas stream after passing through the spinneret, the polymer from each spinneret solidifies into filaments. The filaments are gathered together downstream from the spinneret by a convergence guide, and may be taken up by a roller or a plurality of rollers. This process allows filaments of various sizes and cross sections to be formed, including filaments having, for example, round, elliptical, square, rectangular, lobed or dog-boned cross sections.

Following the extrusion and uptake of the fiber, the fiber is usually drawn, which increases the crystallization and maximizes desirable properties such as orientation along the longitudinal axis, which in turn increases elasticity and strength. The drawing can be done in combination with take-up by using a series of rollers, some of which are generally heated, or can be done as a separate stage in the process of fiber formation.

The polymer can be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber can be from about 0.5 to 100 denier per filament, preferably about 1.0 to 10.0, most preferably 3.0 to 5.0 denier per filament. The required size and strength of a fiber can be readily determined by one of ordinary skill in the art for any given application.

The resulting filamentary material is amenable to further processing through the use of additional processing equipment, or it may be used directly in applications requiring a continuous filament textile yarn. If desired, the filamentary material subsequently may be converted from a flat yarn to a textured yarn through known false twist texturing conditions or other processes known. In particular, it is desirable to increase the surface area of the fiber to provide a softer feel and to enhance the ability of the fibers to breathe, thereby providing better insulation and water retention in the case of textiles, for example. To increase the surface area of a fiber, the fiber can be crimped or twisted by the false twist method, air jet, edge crimp, gear crimp, or stuffer box, for example. Alternatively, the fibers can be cut into shorter lengths, called staple, which can be processed into yarn. A skilled artisan can determine the best method of crimping or twisting based on the desired application and the composition of the fiber.

After formation, the fibers are finished by any method appropriate to the desired final use. In the case of textiles, this may include dyeing, sizing, or addition of chemical agents such as antistatic agents, flame retardants, UV light stabilizers, antioxidants, pigments, dyes, stain resistants, and antimicrobial agents, which are appropriate to adjust the look and hand of the fibers. For industrial applications, the fibers can be treated to impart additional desired characteristics such as strength, elasticity or shrinkage, for example.

Continuous filament fiber containing the sulfonated aliphatic-aromatic copolyesters can be used either as produced or texturized for use in a variety of applications such as textile fabrics for apparel and home furnishings, for example. High tenacity fiber can be used in industrial applications such as high strength fabrics, tarpaulins, sail cloth, sewing threads and rubber reinforcement for tires and V-belts, for example. Staple fiber containing the sulfonated aliphatic-aromatic copolyesters can be used to form blends with natural fibers, especially cotton and wool. The polyester fiber is a chemically resistant fiber, which is generally resistant to mold, mildew, and other problems inherent to natural fibers. The polyester fiber further provides strength and abrasion resistance and lowers the cost of material. Therefore, it is ideal for use in textiles and other commercial applications, such as for use in fabrics for apparel, home furnishings and carpets. Further, the sulfonated aliphatic-aromatic copolyester can be used with another synthetic or natural polymer to form heterogeneous fiber, thereby providing a fiber with improved properties. The heterogeneous fiber and bicomponent fiber may be formed in any suitable manner, such as, for example, side-by-side, sheath-core, and matrix designs.

The sulfonated aliphatic-aromatic copolyesters can be formed into shaped foamed articles. Polyesters, such as poly (ethylene terephthalate), typically have higher densities than other polymers. It is therefore desirable to be able to foam polyester materials to decrease the weight of molded parts, films, sheets, food trays, thermoformed parts. Such foamed articles also provide improved insulating properties than unfoamed articles.

It is generally preferred that a polyester to be foamed have a sufficiently high melt viscosity to hold a foamed shape sufficiently long for the polyester to solidify to form the final foamed article. A sufficient melt viscosity can be achieved by raising the inherent viscosity of the polyester as-formed, typically using post-polymerization processes, such as the solid state polymerization method, as described above. Alternatively, a branching agent can be incorporated into the polyester as described in U.S. Pat. Nos. 4,132,707, 4,145,466, 4,999, 388, 5,000,991, 5,110,844, 5,128,383, and 5,134,028. Such branched polyesters can additionally be subjected to solid-state polymerization, as described above, to further enhance the melt viscosity. The polyester can also contain a chain extension agent, such as a dianhydride or a polyepoxide, which is typically added during the foaming process.

The sulfonated aliphatic-aromatic polyesters can be foamed by a wide variety of methods, including the injection of an inert gas such as nitrogen or carbon dioxide into the melt during extrusion or molding operations. Alternatively, inert hydrocarbon gases such as methane, ethane, propane, butane, and pentane, or chlorofluorocarbons, hydrochlorofluorocarbons, hydrofluorocarbons, can be used. Another method includes the dry blending of chemical blowing agents with the polyester and then extruding or molding the blend to provide foamed articles. During the extrusion or molding operation, an inert gas such as nitrogen is released from the blowing agents and provides the foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxa-diazin-2-one, sodium borohydride, sodium bicarbonate, 5-phenyltetrazole, and p,p'-oxybis(benzenesulfonylhydrazide). Still another method includes the blending of sodium carbonate or sodium bicarbonate with one portion of polyester pellets, blending of an organic acid, such as citric acid, with another portion of polyester pellets and then blending of the two types of pellets by extruding or molding at elevated temperatures. Carbon dioxide gas is released from the interaction of the sodium carbonate and citric acid to provide the desired foaming action in the polymeric melt.

It is desirable that the foamable polyester compositions include nucleation agents to create sites for bubble initiation, influence the cell size of the foamed sheet or object and hasten the solidification of the foamed article. Examples of nucleation agents include sodium acetate, talc, titanium dioxide, polyolefin materials such as polyethylene, and polypropylene.

Polymeric foaming equipment and processes are known, and are disclosed, for example, in U.S. Pat. Nos. 5,116,881, 5,134,028, 4,626,183, 5,128,383, 4,746,478, 5,110,844, 5,000,844, and. 4,761,256; and in *Kirk-Othmer Encyclopedia of Chemical Technology*, Third Edition, Volume 11, pp. 82-145 (1980), John Wiley and Sons, Inc., New York, N.Y. and the Encyclopedia of Polymer Science and Engineering, Second Edition, Volume 2, pp. 434-446 (1985), John Wiley and Sons, Inc., New York, N.Y.

The foamable polyester compositions can include a wide variety of additives and/or fillers, as disclosed hereinabove, and can be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods

Unless otherwise stated, the following test methods are used in the Examples and Comparative Examples disclosed herein.

Differential Scanning Calorimetry, (DSC), is performed on a TA Instruments Model Number 2920 machine. Samples are heated under a nitrogen atmosphere at a rate of 20° C./minute to 300° C., programmed cooled back to room temperature at a rate of 20° C./minute and then reheated to 300° C. at a rate of 20° C./minute. The observed sample $T_g$ and crystalline melting temperature ($T_m$) provided herein below are from the second heating step.

Inherent Viscosity (IV) is used herein as defined in "Preparative Methods of Polymer Chemistry", W. R. Sorenson and T. W. Campbell, 1961, p. 35. It is determined at a concentration of 0.5 g/100 mL of a 50:50 weight percent trifluoroacetic acid:dichloromethane acid solvent system at room temperature by a Goodyear R-103B method.

Laboratory Relative Viscosity (LRV) is the ratio of the viscosity of a solution of 0.6 gram of the polyester sample dissolved in 10 mL of hexafluoroisopropanol (HFIP) containing 80 ppm sulfuric acid to the viscosity of the sulfuric acid-containing hexafluoroisopropanol itself, both measured at 25° C. in a capillary viscometer. The LRV can be mathematically related to IV. Where this relationship is utilized, the term "calculated IV" is noted. Biodegradation was performed according to the ISO 14855 method "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58° C.+/−2° C. The test was conducted with one polymer sample. The carbon dioxide evolved is used to determine the extent of biodegradation.

Prior to testing film properties, the film samples are conditioned for 40 hours at 72° F. and 50 percent humidity. Elmendorf Tear is determined as per ASTM 1922. Graves Tear is determined as per ASTM D1004. Tensile Strength at break, tensile modulus and percent elongation at break is determined as per ASTM D882.

Comparative Example CE 1

To a 250 milliliter glass flask were added the following reaction mixture components: bis(2-hydroxyethyl)terephthalate, (63.56 grams), ethylene glycol, (18.62 grams), dimethyl isophthalate-3-sodium sulfonate, (2.96 grams), dimethyl adipate, (43.55 grams), 1,2,4,5-benzenetetracarboxylic dianhydride, (0.098 grams), and titanium(IV) isopropoxide, (0.0582 grams). The reaction mixture was stirred and heated to 180° C. under a slow nitrogen purge. After reaching 180° C., the reaction mixture was heated to 200° C. over 0.4 hours with stirring under a slow nitrogen purge. The resulting reaction mixture was stirred at 200° C. for 1.1 hours with a slight nitrogen purge. The reaction mixture was then heated to 255° C. over 1.3 hours with stirring and a slow nitrogen purge. The resulting reaction mixture was stirred at 255° C. under a slight nitrogen purge for 0.8 hours. 13.55 grams of a colorless distillate was collected over this heating cycle. The reaction mixture was then staged to full vacuum with stirring at 255° C. The resulting reaction mixture was stirred for 1.7 hours under full vacuum, (pressure less than 100 mtorr). The vacuum was then released with nitrogen and the reaction mass allowed to cool to room temperature. An additional 14.44 grams of distillate was recovered and 90.8 grams of a solid product was recovered.

A sample was measured for laboratory relative viscosity, (LRV), as described above and was found to have an LRV of 27.80. This sample was calculated to have an inherent viscosity of 0.75 dL/g. A sample underwent differential scanning calorimetry, (DSC), analysis. No thermal transitions were observed within the first and second heating cycles.

Example 1

To a 250 milliliter glass flask were added the following reaction mixture components: isophthalate-3-sodium sulfonate, (2.96 grams), dimethyl adipate, (43.55 grams), 1,2,4,5-benzenetetracarboxylic dianhydride, (0.098 grams), and titanium(IV) isopropoxide, (0.0582 grams). The reaction mixture was stirred and heated to 180° C. under a slow nitrogen purge. After reaching 180° C., the reaction mixture was heated to 200° C. over 1.5 hours with stirring under a slow nitrogen purge. The resulting reaction mixture was stirred at 200° C. for 1.0 hour with a slight nitrogen purge. The reaction mixture was then heated to 255° C. over 1.0 hour with stirring and a slow nitrogen purge. The resulting reaction mixture was stirred at 255° C. under a slight nitrogen purge for 0.5 hours. 21.35 grams of a colorless distillate was collected over this heating cycle. The reaction mixture was then staged to full vacuum with stirring at 255° C. The resulting reaction mixture was stirred for 0.8 hours under full vacuum, (pressure less than 100 mtorr). The vacuum was then released with nitrogen and the reaction mass allowed to cool to room temperature. An additional 8.39 grams of distillate was recovered and 86.0 grams of a solid product was recovered.

A sample was measured for LRV as described above and was found to have an LRV of 33.66. This sample was calculated to have an inherent viscosity of 0.86 dL/g. A sample underwent differential scanning calorimetry (DSC) analysis, and a crystalline $T_m$ was observed at 138.5° C., (16.0 J/g).

The sulfonated aliphatic-aromatic copolyester prepared in Example 1 was found to have a high level of crystallinity while comparable sulfonated aliphatic-aromatic copolyesters conventionally prepared from ethylene glycol, as shown in Comparative Example CE 1, were found to either be intrinsically amorphous or to have such a slow crystallization rate as to be effectively amorphous.

Example 2

To a 1 liter glass flask were added the following reaction mixture components: dimethyl terephthalate, (239.10 grams), 1,3-propanediol, (247.33 grams), dimethyl isophthalate-3-sodium sulfonate, (5.55 grams), dimethyl succinate, (182.68 grams), manganese(II) acetate tetrahydrate, (0.209 grams), and antimony(III) trioxide, (0.168 grams). The reaction mixture was stirred and heated to 180° C. under a slow nitrogen purge. After reaching 180° C., the reaction mixture was heated to 255° C. over 3.0 hours, with stirring, under a slow nitrogen purge. The resulting reaction mixture was stirred at 255° C. under a slight nitrogen purge for 1.6 hours. 164.9 grams of a colorless distillate was collected over the heating cycle. The reaction mixture was then staged to full vacuum with stirring at 255° C. The resulting reaction mixture was stirred for 3.3 hours under full vacuum, (pressure less than 100 mtorr). The vacuum was then released with nitrogen and the reaction mass allowed to cool to room temperature. An additional 49.7 grams of distillate was recovered and 420.0 grams of a solid product was recovered.

A sample was measured for LRV as described above and was found to have an LRV of 10.51. This sample was calculated to have an inherent viscosity of 0.44 dL/g. A sample underwent differential scanning calorimetry, (DSC), analysis. A broad crystalline $T_m$ observed at 140.5° C., (25.0 J/g). A sample was also subjected to the biodegradation test, as defined above. After 13 days, 8.3 percent biodegradation was observed.

Example 3

To a 250 milliliter glass flask were added the following reaction mixture components: dimethyl terephthalate, (59.8 grams), 1,3-propanediol, (61.8 grams), dimethyl isophthalate-3-sodium sulfonate, (1.4 grams), dimethyl succinate, (45.7 grams), silica, (9.5 grams), manganese(II) acetate tetrahydrate, (0.052 grams), and antimony(III) trioxide, (0.042 grams). The reaction mixture was stirred and heated to 180° C. under a slow nitrogen purge.

After reaching 180° C., the reaction mixture was heated to 255° C. over 3.1 hours with stirring under a slow nitrogen purge. The resulting reaction mixture was stirred at 255° C. under a slight nitrogen purge for 1.3 hours. 28.4 grams of a colorless distillate was collected over this heating cycle. The reaction mixture was then staged to full vacuum with stirring at 255° C. The resulting reaction mixture was stirred for 2.6 hours under full vacuum, (pressure less than 100 mtorr). The vacuum was then released with nitrogen and the reaction mass allowed to cool to room temperature. An additional 10.8 grams of distillate was recovered and 104.4 grams of a solid product was recovered.

A sample was measured for LRV as described above and calculated to have an inherent viscosity of 0.46 dL/g. A sample underwent differential scanning calorimetry, (DSC), analysis. A broad crystalline $T_m$ was observed at 138.5° C., (19.7 J/g).

Comparative Example CE 2

To a 250 milliliter glass flask were added the following reaction mixture components: bis(2-hydroxyethyl)terephthalate, (88.86 grams), ethylene glycol, (6.27 grams), dimethyl isophthalate-3-sodium sulfonate, (0.15 grams), dimethyl glutarate, (24.03 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 275° C. over 3.6 hours with stirring under a slow nitrogen purge. The resulting reaction mixture was stirred at 275° C. under a slight nitrogen purge for 1 hour. 12.8 grams of a colorless distillate was collected over this heating cycle. The reaction mixture was then staged to full vacuum with stirring at 275° C. The resulting reaction mixture was stirred for 2.4 hours under full vacuum, (pressure less than 100 mtorr). The vacuum was then released with nitrogen and the reaction mass allowed to cool to room temperature. An additional 7.0 grams of distillate was recovered and 64.0 grams of a solid product was recovered.

A sample was measured for LRV as described above and was found to have an LRV of 32.7. The sample was calculated to have an inherent viscosity of 0.84 dL/g. A sample underwent differential scanning calorimetry, (DSC), analysis. A $T_g$ was found with an onset temperature of 35.8° C., a midpoint temperature of 37.6° C., and an endpoint temperature of 39.5° C. A broad $T_m$ was observed at 185.1° C., (16.8 J/g).

Comparative Example CE 3

To a 250 milliliter glass flask were added the following reaction mixture components: dimethyl terephthalate, (67.87 grams), 1,4-butanediol, (58.58 grams), dimethyl isophthalate-3-sodium sulfonate, (0.148 grams), dimethyl glutarate, (24.03 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 255° C. over 2.7 hours with stirring under a slow nitrogen purge. The resulting reaction mixture was stirred at 255° C. under a slight nitrogen purge for 1.0 hour. 35.4 grams of a colorless distillate was collected over this heating cycle. The reaction mixture was then staged to full vacuum with stirring at 255° C. The resulting reaction mixture was stirred for 3.7 hours under full vacuum, (pressure less than 100 mtorr). The vacuum was then released with nitrogen and the reaction mass allowed to cool to room temperature. An additional 1.1 grams of distillate was recovered and 91.0 grams of a solid product was recovered.

A sample was measured for LRV as described above and was found to have an LRV of 6.56. This sample was calculated to have an inherent viscosity of 0.36 dL/g. A sample underwent DSC analysis. A crystalline $T_m$ was observed at 174.3° C., (25.2 J/g).

Example 4

To a 250 milliliter glass flask were added the following reaction mixture components: dimethyl terephthalate, (67.87 grams), 1,3-propanediol, (49.50 grams), dimethyl isophthalate-3-sodium sulfonate, (0.150 grams), dimethyl glutarate, (24.00 grams), manganese(II) acetate tetrahydrate, (0.049 grams), and antimony(III) trioxide, (0.033 grams). The reaction mixture was stirred and heated to 180° C. under a slow nitrogen purge. After reaching 180° C., the reaction mixture was heated to 2° C. over 0.6 hours with stirring under a slow nitrogen purge. The resulting reaction mixture was stirred at 200° C. for 1.2 hours under a slight nitrogen purge. The reaction mixture was then heated to 255° C. over 1.2 hours with stirring under a slight nitrogen purge. The resulting reaction mixture was stirred at 255° C. under a slight nitrogen purge for 1.0 hour. 23.9 grams of a colorless distillate was collected over this heating cycle. The reaction mixture was then staged to full vacuum with stirring at 255° C. The resulting reaction mixture was stirred for 3.3 hours under full vacuum, (pressure less than 100 mtorr). The vacuum was then released with nitrogen and the reaction mass allowed to cool to room temperature. An additional 7.9 grams of distillate was recovered and 82.7 grams of a solid product was recovered.

A sample was measured for LRV as described above and was found to have an LRV of 21.93. This sample was calculated to have an inherent viscosity of 0.64 dL/g. A sample underwent DSC analysis. A crystalline $T_m$ was observed at 185.0° C., (40.3 J/g).

Example 5

To a 250 milliliter glass flask were added the following reaction mixture components: dimethyl terephthalate, (66.02 grams), 1,3-propanediol, (49.47 grams), dimethyl isophthalate-3-sodium sulfonate, (2.96 grams), dimethyl adipate, (26.13 grams), 1,2,4-benzenetricarboxylic anhydride, (0.20 grams), and titanium(IV) isopropoxide, (0.0582 grams). The reaction mixture was stirred and heated to 180° C. under a slow nitrogen purge. After reaching 180° C., the reaction mixture was heated to 200° C. with stirring while under a slow nitrogen purge. The resulting reaction mixture was allowed to stir at 200° C. for 1 hour with a slow nitrogen purge. The reaction mixture was then heated to 255° C. over 0.80 hours with stirring under a slow nitrogen purge. The resulting reaction mixture was stirred at 255° C. under a slight nitrogen purge for 0.75 hour. 21.18 grams of a colorless distillate was collected over this heating cycle. The reaction mixture was then staged to full vacuum with stirring at 255° C. The resulting reaction mixture was stirred for 3.5 hours under full vacuum, (pressure less than 100 mtorr). The vacuum was then released with nitrogen and the reaction mass allowed to cool to room temperature. An additional 4.60 grams of distillate was recovered and 90.3 grams of a solid product was recovered.

A sample was measured for LRV as described above and was found to have an LRV of 34.54. This sample was calculated to have an inherent viscosity of 0.87 dL/g. A sample underwent DSC analysis. A crystalline $T_m$ was observed at 178.0° C., (35.5 J/g).

Comparative Example CE 4

To a 250 milliliter glass flask were added the following reaction mixture components: bis(2-hydroxyethyl)terephthalate, (105.51 grams), dimethyl isophthalate-3-sodium sulfonate, (2.96 grams), dimethyl glutarate, (12.01 grams), manganese(II) acetate tetrahydrate, (0.042 grams), and antimony (III) trioxide, (0.034 grams). The reaction mixture was stirred and heated to 180° C. under a slow nitrogen purge. After reaching 180° C., the reaction mixture was heated to 275° C. over 3.6 hours with stirring under a slow nitrogen purge. The resulting reaction mixture was stirred at 275° C. under a slight nitrogen purge for 1 hour. 13.1 grams of a colorless distillate was collected over this heating cycle. The reaction mixture was then staged to full vacuum with stirring at 275° C. The resulting reaction mixture was stirred for 1.8 hours under full vacuum, (pressure less than 100 mtorr). The vacuum was then released with nitrogen and the reaction mass allowed to cool to room temperature. An additional 3.2 grams of distillate was recovered and 61.7 grams of a solid product was recovered.

A sample was measured for inherent viscosity (IV) as described above and was found to have an IV of 0.61 dL/g. A sample underwent DSC analysis. A $T_g$ was found with an onset temperature of 51.6° C., a midpoint temperature of 53.6° C., and an endpoint temperature of 55.5° C. A crystalline $T_m$ was observed at 210.8° C., (26.5 J/g).

Comparative Example CE 5

To a 250 milliliter glass flask were added the following reaction mixture components: dimethyl terephthalate, (161.18 grams), 1,4-butanediol, (144.2 grams), dimethyl isophthalate-3-sodium sulfonate, (5.92 grams), dimethyl glutarate, (24.02 grams), manganese(II) acetate tetrahydrate, (0.168 grams), and antimony(III) trioxide, (0.068 grams). The reaction mixture was stirred and heated to 180° C. under a slow nitrogen purge. After reaching 180° C., the reaction mixture was heated to 200° C. over 1.6 hours with stirring under a slow nitrogen purge. The resulting reaction mixture was allowed to stir at 200° C. for 1.0 hour while under a slight nitrogen purge. The stirred reaction mixture was then heated to 255° C. over 1.8 hours under a slight nitrogen purge. The resulting reaction mixture was stirred at 255° C. under a slight nitrogen purge for 0.2 hour. 96.5 grams of a colorless distillate was collected over this heating cycle. The reaction mixture was then staged to full vacuum with stirring at 255° C. The resulting reaction mixture was stirred for 2.6 hours under full vacuum, (pressure less than 100 mtorr). The vacuum was then released with nitrogen and the reaction mass allowed to cool to room temperature. 184.7 grams of a solid product was recovered.

The sample was measured for LRV as described above and was found to have an LRV of 2.64. This sample was calculated to have an inherent viscosity of 0.29 dL/g. A sample underwent DSC analysis. A crystalline $T_m$ was observed at 178.0° C., (29.7 J/g).

Example 6

To a 250 milliliter glass flask were added the following reaction mixture components: dimethyl terephthalate, (80.59 grams), 1,3-propanediol, (49.47 grams), dimethyl isophthalate-3-sodium sulfonate, (2.96 grams), dimethyl glutarate, (12.01 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 255° C. over 4.25 hours with stirring under a slow nitrogen purge. The resulting reaction mixture was stirred at 255° C. under a slight nitrogen purge for 0.8 hour. 27.4 grams of a colorless distillate was collected over the heating cycle. The reaction mixture was then staged to full vacuum with stirring at 255° C. The resulting reaction mixture was stirred for 3.0 hours under full vacuum, (pressure less than 100 mtorr). The vacuum was then released with nitrogen and the reaction mass allowed to cool to room temperature. An additional 9.1 grams of distillate was recovered and 70.0 grams of a solid product was recovered.

A sample was measured for LRV as described above and was found to have an LRV of 23.02. This sample was calculated to have an inherent viscosity of 0.66 dL/g. A sample underwent DSC analysis. A $T_g$ was found with an onset temperature of 23.5° C., a midpoint temperature of 27.8° C., and an endpoint temperature of 31.6° C. A crystalline $T_m$ was observed at 207.8° C., (42.4 J/g).

Examples 7-12

Polymers prepared as described above in the Examples and Comparative Examples, as noted below in Table 1, except at a larger scale, are dried in a hopper dryer for 8 hours at 60° C. to a −40° C. dew point. The dried polymers are placed in the hopper of a single screw volumetric feeder (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150-RPM screw speed with the heater profile as used in Comparative Example 1.

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils. 8 inch by 16 inch rectangles are cut out of the films prepared in Example 7 and the sizes accurately measured. The film rectangles are placed in a Fisher Scientific Isotemp Incubator, Model Number 625D, heated to 60° C. for 1 hour. The film rectangles are then accurately remeasured to determine shrinkage. The films of Examples 7-12 are tested as fast food sandwich wraps.

Examples 13-18 and Comparative Example CE 7

The films produced in the Examples listed below in Table 2, with a thickness of between about 1.5 mils to 8 mils, are sent through a Machine Direction Orienter (MDO) Model Number 7200 from the Marshall and Williams Company of Providence, R.I. The MDO unit is preheated to the temperature listed in Table 2, below, and the film is stretched as noted below in Table 2 while at that temperature. For example, "Stretched 3×" means that, for example, a 1 meter long film would be stretched to a resultant length of 3 meters.

TABLE 2

| Example | Cast Film Example | MDO Temperature (C.) | MDO Stretch |
| --- | --- | --- | --- |
| CE 7 | CE 6 | 60 | 4× |
| 13 | 7 | 40 | 4× |
| 14 | 8 | 40 | 4× |
| 15 | 9 | 40 | 3.5× |

TABLE 2-continued

| Example | Cast Film Example | MDO Temperature (C.) | MDO Stretch |
| --- | --- | --- | --- |
| 16 | 10 | 50 | 4× |
| 17 | 11 | 50 | 3.5× |
| 18 | 12 | 60 | 3.5× |

The uniaxially stretched films in Examples 13-18 are tested as a fast food sandwich wrap packaging.

Examples 19-24

2 inch squares of the films listed in Table 1 and detailed in Table 3 below are preheated to the temperature noted below in Table 3 for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second).

TABLE 3

| Example | Cast Film Example | Biaxial Stretch Temperature (C.) |
| --- | --- | --- |
| 19 | 7 | 50 |
| 20 | 8 | 50 |
| 21 | 9 | 50 |
| 22 | 10 | 60 |
| 23 | 11 | 60 |
| 24 | 12 | 70 |

The biaxially stretched films prepared in Examples 19-24 are tested as a fast food sandwich wrap packaging.

Examples 25-29

A polymer prepared as described in Example 4, except at a larger scale, is dried in a hopper dryer for 8 hours at 100° C. to a −40° C. dew point. The dried polymer is powder blended with 0.10 weight percent (based on polymer weight) Irganox-1010® hindered phenolic antioxidant from the Ciba Company. The blended polymer is placed in the hopper of a single screw volumetric feeder (K-tron Model No. 7) from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) |
| --- | --- | --- | --- | --- | --- |
| 160 | 195 | 205 | 205 | 205 | 210 |

A plasticizer, acetyl tri-n-butyl citrate, from Morflex, Inc., is injected into zone 2 with an Accurate® feeder at a rate to provide the compositions listed below in Table 4. The plasticizer content shown in Table 4 is based on the weight of the total composition.

TABLE 4

| Example | Plasticizer (wt. %) |
|---|---|
| 25 | 0 |
| 26 | 5 |
| 27 | 10 |
| 28 | 15 |
| 29 | 20 |
| 30 | 0 |
| 31 | 5 |
| 32 | 10 |
| 33 | 20 |
| 34 | 30 |

The extruded polymer film is electrostatically pinned on an 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils. The films are tested as fast food sandwich wrap packaging.

Examples 30-34

A polymer prepared as in Example 5, except at a larger scale, is dried in a hopper dryer for 8 hours at 100° C. to a −40° C. dew point. The material is powder blended with 0.10 weight percent, (based on polymer weight), Irganox-1010, a hindered phenolic antioxidant from the Ciba Company. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) |
|---|---|---|---|---|---|
| 160 | 195 | 205 | 205 | 205 | 210 |

Plasticizer (acetyl tri-n-butyl citrate, from Morflex, Inc.) is injected as described above and processed as described for Examples 25-29.

The films are tested as fast food sandwich wrap packaging.

Examples 35-40

The compositions listed in Table 5, below are prepared as follows. A polymer prepared as described in Example 2, above, except at a larger scale, is dried overnight in a large tray dryer at 60° C. with hot dry air recirculation to a moisture content of less than 0.04 percent. Corn starch, (Corn Products 3005 from CPC International, Inc.), and rice starch, (Sigma Chemicals catalog number S7260), are dried in a large tray vacuum oven at 90° C. and less than 1 mm Hg vacuum to a moisture content of less than 1 percent and stored in sealed containers until used. Polyethylene adipate, (Rucoflex® S-101-55, nominal molecular weight of 2000, from the Ruco Polymer Corporation), is used directly as received without pretreatment.

Blends of the polymer and starch are made by manually tumbling the materials in plastic bags. The dry starch is added to the warm polymer from the dryer, and the still warm mixture fed to the extruder. When Rucoflex® polyethylene adipate is used, the polyethylene adipate is melted and liquid injected into the second heater zone of the extruder through a metering pump.

TABLE 5

| Example | Polymer (wt. %) | Cornstarch (wt. %) | rice starch (wt. %) | polyethylene adipate (wt. %) |
|---|---|---|---|---|
| 35 | 80 | 20 | | |
| 36 | 60 | 40 | | |
| 37 | 55 | 40 | | 5 |
| 38 | 45 | 35 | | 20 |
| 39 | 60 | | 40 | |
| 40 | 45 | 35 | | 20 |
| 41 | 80 | 20 | | |
| 42 | 60 | 40 | | |
| 43 | 55 | 40 | | 5 |
| 44 | 45 | 35 | | 20 |
| 45 | 60 | | 40 | |
| 46 | 45 | 35 | | 20 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a mild mixing screw. The temperature of the extruder barrel is electrically heated from 130° C. at the feed end of the extruder to 160° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Operating conditions for the individual compositions are listed in Table 6.

TABLE 6

| Example Number | Feed Rate (pph) | Screw Torque (% max.) | Die Pressure (psig) | Melt Temperature (C.) | Vacuum (Inches Hg) |
|---|---|---|---|---|---|
| 35 | 34 | 58 | 800 | 170 | 13 |
| 36 | 32 | 60 | 800 | 190 | 13 |
| 37 | 31 | 50 | 750 | 185 | 12 |
| 38 | 32 | 35 | 600 | 165 | 12 |
| 39 | 33 | 60 | 800 | 190 | 13 |
| 40 | 32 | 35 | 600 | 165 | 13 |
| 41 | 34 | 58 | 800 | 170 | 13 |
| 42 | 32 | 60 | 800 | 190 | 13 |
| 43 | 31 | 50 | 750 | 185 | 12 |
| 44 | 32 | 35 | 600 | 165 | 12 |
| 45 | 33 | 60 | 800 | 190 | 13 |
| 46 | 32 | 35 | 600 | 165 | 13 |

Examples 41-46

The compositions listed in Table 5, above, are prepared as follows. A polymer prepared as described in Example 3, above, except at a larger scale, is dried overnight in a large tray dryer at 60° C. with hot dry air recirculation to a moisture content of less than 0.04 percent. Corn starch, (Corn Products 3005 from CPC International, Inc.), and rice starch, (Sigma Chemicals catalog number S7260), are dried in a large tray vacuum oven at 90° C. and less than, 1 mm Hg vacuum to a moisture content of less than 1 percent and stored in sealed containers until used. Rucoflex® S-101-55 polyethylene adipate from the Ruco Polymer Corporation is used directly as received without pretreatment, and is melted and liquid injected into the second heater zone of the extruder through a metering pump.

Blends of the polymer and starch are made by manually tumbling the materials in plastic bags. The dry starch is added to the warm polymer from the dryer, and the still warm mixture fed to the extruder. The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a mild mixing screw. The temperature of the extruder barrel is electrically heated from 130° C. at the feed end of the extruder to 160° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Specific operating conditions for the individual compositions are listed above in Table 6.

Examples 47-58

The polymer-starch blends prepared above in Examples 35-46 are dried in a hopper dryer for 8 hours at 80° C. to a −40° C. dew point, then are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 145 | 170 | 190 | 190 | 190 | 195 | 200 |

The extruded polymer films are electrostatically pinned on a 12 inch diameter smooth quench drum maintained at a temperature of 26° C. with cold water and collected on release paper using a standard tension roll.

The quench drum speed is adjusted from 5 to 15 feet per minute to obtain film samples with a thickness of about 8 mils to about 1.5 mils.

TABLE 7

| Example | Blend Example |
|---|---|
| 47 | 35 |
| 48 | 36 |
| 49 | 37 |
| 50 | 38 |
| 51 | 39 |
| 52 | 40 |
| 53 | 41 |
| 54 | 42 |
| 55 | 43 |
| 56 | 33 |
| 57 | 45 |
| 58 | 46 |

The films are tested as fast food sandwich packaging.

Examples 59-65

The compositions listed in Table 8, below, are prepared as follows. A polymer prepared as described in Example 5, above, except at a larger scale, is dried overnight in a large tray dryer at 60° C. with hot dry air recirculation to a moisture content of less than 0.04 percent. Talc, (from Luzenac, located in Englewood, Colo., having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate, (from ECCA Calcium Products, Inc., of Sylacauga, Ala., ECC Supercoat(T) grade with a 1 micron average particle size), are dried in a large tray vacuum oven at 90° C. and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder.

TABLE 8

| Example | Polymer (wt. %) | Talc (wt. %) | Titanium dioxide (wt. %) | Calcium carbonat (wt. %) |
|---|---|---|---|---|
| 59 | 85 | 2.5 | 5 | 7.5 |
| 60 | 70 | 5 | 5 | 20 |
| 61 | 70 | 5 | 10 | 15 |
| 62 | 30 | 10 | 15 | 45 |
| 63 | 95 | 5 | | |
| 64 | 95 | | 5 | |
| 65 | 70 | | | 30 |
| 66 | 85 | 2.5 | 5 | 7.5 |
| 67 | 70 | 5 | 5 | 20 |
| 68 | 70 | 5 | 10 | 15 |
| 69 | 30 | 10 | 15 | 45 |
| 70 | 95 | 5 | | |
| 71 | 95 | | 5 | |
| 72 | 70 | | | 30 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is electrically heated from 175° C. at the feed end of the extruder to 215° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Operating conditions for the individual compositions are listed below in Table 9.

TABLE 9

| Example Number | Feed Rate (pph) | Screw Torque (% max.) | Die Pressure (psig) | Melt Temperature (C.) | Vacuum (Inches Hg) |
|---|---|---|---|---|---|
| 59 | 34 | 58 | 800 | 205 | 13 |
| 60 | 30 | 70 | 800 | 225 | 13 |
| 61 | 31 | 70 | 800 | 225 | 12 |
| 62 | 32 | 80 | 800 | 230 | 12 |
| 63 | 33 | 50 | 600 | 205 | 13 |
| 64 | 32 | 50 | 600 | 205 | 13 |

TABLE 9-continued

| Example Number | Feed Rate (pph) | Screw Torque (% max.) | Die Pressure (psig) | Melt Temperature (C.) | Vacuum (Inches Hg) |
|---|---|---|---|---|---|
| 65 | 30 | 70 | 800 | 225 | 12 |
| 66 | 34 | 58 | 800 | 160 | 13 |
| 67 | 30 | 70 | 800 | 180 | 13 |
| 68 | 31 | 70 | 800 | 180 | 12 |
| 69 | 32 | 80 | 800 | 190 | 12 |
| 70 | 33 | 50 | 600 | 160 | 13 |
| 71 | 32 | 50 | 600 | 160 | 13 |
| 72 | 30 | 70 | 800 | 180 | 12 |

Examples 66-72

A polymer prepared as described in Example 1, above, except at a larger scale, is dried overnight in a large tray dryer at 60° C. with hot dry air recirculation to a moisture content of less than 0.04 percent. Talc, (from Luzenac, located in Englewood, Colo., having a particle size of 3.8 microns), Tronox® 470 titanium dioxide, (supplied by Kerr-McGee Chemical, LLC, located in Oklahoma City, Okla., having a particle size of 0.17 micron), and calcium carbonate, (from ECCA Calcium Products, Inc., of Sylacauga, Ala., ECC Supercoat(T) grade with a 1 micron average particle size), are dried in a large tray vacuum oven at 90° C. and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder. The final compositions listed in Table 8, above, are prepared.

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is electrically heated from 170° C. at the feed end of the extruder to 205° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Operating conditions for the individual compositions are listed above in Table 9.

Examples 73-80

The polymer-inorganic filler blends prepared above in Examples 59-66 ("Preparative Examples 59-66) and a polymer prepared as described in Example 5, above, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. Example 76 is composed of a tumbled blend of 50 weight percent of Example 62 and 50 weight percent of Example 5. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 175 | 195 | 210 | 210 | 210 | 215 | 210 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 10

| Example | Preparative Example |
|---|---|
| 73 | 59 |
| 74 | 60 |
| 75 | 61 |
| 76 | 50 wt. % 62, 50 wt. % 5 |
| 77 | 63 |
| 78 | 64 |
| 79 | 65 |
| 80 | 66 |
| 81 | 67 |
| 82 | 68 |
| 83 | 50 wt. % 69, 50 wt. % 1 |
| 84 | 70 |
| 85 | 71 |
| 86 | 72 |

The films are tested as fast food sandwich packaging.

Examples 81-86

The polymer-inorganic filler blends prepared above in Examples 67-72 and a polymer prepared as described in Example 1, above, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. Example 83 is composed of a tumbled blend of 50 weight percent of Example 69 and 50 weight percent of Example 1. A dry nitrogen purge is maintained in the feed hopper and the feed throat of the extruder. The extruder is operated at a 150 RPM screw speed with a heater profile of

| Zone 1 (C.) | Zone 2 (C.) | Zone 3 (C.) | Zone 4 (C.) | Zone 5 (C.) | Die (C.) | Melt (C.) |
|---|---|---|---|---|---|---|
| 130 | 150 | 160 | 160 | 160 | 170 | 160 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

Examples 87-90

Polymers prepared as described above in the Examples noted below in Table 11, except at a larger scale, are dried overnight at 60° C. in a dehumidified air dryer. The dried polymers are fed to a laboratory scale blown film line which consisted of a Killion 1.25 inch diameter extruder with a 15:1 gear reducer. The extruder heater zones are set around the temperature noted below in Table 11. The screw is a Maddock mixing type with an L/D of 24 to 1. The compression ratio for the mixing screw is 3.5:1. The screw speed is 25 to 30 RPM. A 1.21 inch diameter die with a 25 mil die gap is used. The air ring is a Killion single-lip, No. 2 type. Blowing conditions can be characterized by the blow up ratio, (BUR), which is the ratio of the bubble diameter to die the die diameter which gives an indication of hoop or transverse direction, (TD), stretch, or the draw-down ratio, (DDR), which is an indication of the axial or machined direction, (MD), stretch. The greater the level of stretch, the greater the level of orientation imbued in the film.

TABLE 11

| Example Number | Blend Example Number | Extruder Heater Zones (C.) | Film Thickness (mils) | BUR | DDR |
|---|---|---|---|---|---|
| 87 | 1 | 160 | 2.0 | 2.5 | 5.0 |
| 88 | 3 | 160 | 2.0 | 2.5 | 5.0 |
| 89 | 4 | 205 | 1.5 | 3.0 | 7.0 |
| 90 | 6 | 230 | 2.3 | 2.0 | 2.0 |

The tubular films are slit and tested as fast food sandwich packaging.

Examples 91-93

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared as described in Example 4, except at a larger scale. Layer B contains a polymer prepared as described in Example 3, except at a larger scale. Both polymers are dried in a dehumidified dryer at 60° C. The operation was tailored to provide the layer ratios for the films noted below in Table 12 as of the total film structure. The thickness of the film is about 2.25 mil (0.00225 inch).

TABLE 12

| Example (wt. %) | Layer A (wt. %) | Layer B |
|---|---|---|
| 91 | 25 | 75 |
| 92 | 50 | 50 |
| 93 | 75 | 25 |

The processing conditions for the film are provided in Table 13, below.

TABLE 13

| | Extruder A | Extruder B |
|---|---|---|
| Zone 1 | 165° C. | 130 C. |
| Zone 2 | 190° C. | 150° C. |
| Zone 3 | 205° C. | 160° C. |
| Zone 4 | 205° C. | 160° C. |
| Zone 5 | 210° C. | 165° C. |

TABLE 13-continued

| | Extruder A | Extruder B |
|---|---|---|
| Screen Changer | 205° C. | 160° C. |
| Adapter 1 | 205° C. | 160° C. |
| Adapter 2 | 205° C. | 160° C. |
| Adapter 4 | 205° C. | 160° C. |
| Die 1 | 205° C. | 205° C. |
| Die 2 | 205° C. | 205° C. |
| Die 3 | 205° C. | 205° C. |
| Line Speed | 122 feet per minute | |
| Notes | 4 | 3 |

The multilayer films prepared above are converted into bags using an inline bag machine manufactured by Battenfeld Gloucester Engineering Co., Inc. downstream of the extrusion line nips.

The slit films are tested as fast food sandwich wraps.

Examples 94-96

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared as described in Example 5, except at a larger scale. Layer B contains a polymer prepared as described in Example 1, except at a larger scale. Both polymers are dried in a dehumidified dryer at 60° C. The operation is tailored to provide the layer ratios for the films noted below in Table 14 as of the total film structure. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 94 | 25 | 75 |
| 95 | 50 | 50 |
| 96 | 75 | 25 |

TABLE 15

| | Extruder A | Extruder B |
|---|---|---|
| Zone 1 | 175 C. | 130 C. |
| Zone 2 | 95 C. | 155° C. |
| Zone 3 | 205 C. | 165° C. |
| Zone 4 | 205 C. | 165 C. |
| Zone 5 | 210 C. | 170° C. |
| Screen Changer | 205 C. | 165° C. |
| Adapter 1 | 205 C. | 165° C. |
| Adapter 2 | 205 C. | 165° C. |
| Adapter 4 | 205 C. | 165° C. |
| Die 1 | 205 C. | 205° C. |
| Die 2 | 205 C. | 205° C. |
| Die 3 | 205 C. | 205° C. |
| Line Speed | 122 feet per minute | |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 97-99

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a starch-filled polymer prepared as described in Example 37. Layer B contains Eastar® Bio polymer, from the Eastman Chemical Company and as described above. Both polymers are dried in a dehumidified dryer at 60° C. The operation was tailored to provide the layer ratios for the films noted below in Table 16 as of the total film structure. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 97 | 25 | 75 |
| 98 | 50 | 50 |
| 99 | 75 | 25 |

TABLE 17

|  | Extruder A | Extruder B |
|---|---|---|
| Zone 1 | 130° C. | 100 C. |
| Zone 2 | 150 C. | 115° C. |
| Zone 3 | 170° C. | 130° C. |
| Zone 4 | 170 C. | 130° C. |
| Zone 5 | 175° C. | 135° C. |
| Screen Changer | 170 C. | 130° C. |
| Adapter 1 | 170 C. | 130° C. |
| Adapter 2 | 170 C. | 130° C. |
| Adapter 4 | 170 C. | 130° C. |
| Die 1 | 170 C. | 170° C. |
| Die 2 | 170 C. | 170° C. |
| Die 3 | 170 C. | 170° C. |
| Line Speed | 122 feet per minute | |

The multilayer films prepared above are converted into bags using an inline bag machine manufactured by Battenfeld Gloucester Engineering Co., Inc. downstream of the extrusion line nips. The slit films are tested as fast food sandwich wraps.

Examples 100-147 and Comparative Examples CE 8-CE 10

The polyester resins prepared as described in the Examples and Comparative Examples listed below in Table 18, except at a larger scale, are dried in a desiccant air dryer with a dew point of −40° C. overnight at a temperature of 60° C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 rpm. The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time the paperboard stock noted below in Table 18, that is 32 inches wide, is fed into the nip with the roll in contact with the film. A nip pressure of 100 pounds per linear inch is applied. A 24-inch diameter mirror finished chill roll is maintained at a temperature of 19° C. during the extrusion trials. The coated paperboard is taken off the chill roll at a point 180 degrees from the nip formed by the pressure roll and the chill roll. The chill roll is operated at linear speeds of 300 feet per minute. At this coating speed, a polyester resin thickness of 1.25 mils is obtained. The polyester resin thickness can be varied by operational modifications.

TABLE 18

| Example | Polymer Example | Extruder Temperature (C.) | Paper/Paperboard Stock |
|---|---|---|---|
| CE 8 | CE 1 | 150 | 18 pound basis weight natural paper |
| 100 | 1 | 160 | 18 pound basis weight natural paper |
| 101 | 2 | 170 | 25 pound basis weight bleached kraft paper |
| 102 | 3 | 165 | 35 pound basis weight natural kraft paper |
| 103 | 4 | 220 | Parchment |
| 104 | 5 | 210 | 15 pound basis weight kraft paper |
| 105 | 6 | 230 | 18 pound basis weight bleached paper |
| 106 | 35 | 170 | 18 pound basis weight natural paper |
| 107 | 38 | 160 | 25 pound weight basis bleached kraft paper |
| 108 | 39 | 170 | 35 pound basis weight natural kraft paper |
| 109 | 43 | 170 | Parchment |
| 110 | 59 | 210 | 15 pound basis weight kraft paper |
| 111 | 61 | 210 | 18 pound basis weight bleached paper |
| 112 | 65 | 210 | 18 pound basis weight natural paper |
| 113 | 67 | 160 | 25 pound weight basis bleached kraft paper |
| 114 | 68 | 170 | 35 pound basis weight natural kraft paper |
| 115 | 70 | 160 | Parchment |
| CE 9 | CE 1 | 150 | Trilayered cup paperboard (210 g/m2 weight) |
| 116 | 1 | 160 | Trilayered cup paperboard (210 g/m2 weight) |
| 117 | 2 | 170 | Trilayered cup paperboard (210 g/m2 weight) |
| 118 | 3 | 165 | Trilayered cup paperboard (210 g/m2 weight) |
| 119 | 4 | 220 | Trilayered cup paperboard (210 g/m2 weight) |
| 120 | 5 | 210 | Trilayered cup paperboard (210 g/m2 weight) |
| 121 | 6 | 230 | Trilayered cup paperboard (210 g/m2 weight) |
| 122 | 35 | 170 | Trilayered cup paperboard (210 g/m2 weight) |
| 123 | 38 | 160 | Trilayered cup paperboard (210 g/m2 weight) |
| 124 | 39 | 170 | Trilayered cup paperboard (210 g/m2 weight) |
| 125 | 43 | 170 | Trilayered cup paperboard (210 g/m2 weight) |
| 126 | 59 | 210 | Trilayered cup paperboard (210 g/m2 weight) |
| 127 | 61 | 210 | Trilayered cup paperboard (210 g/m2 weight) |

TABLE 18-continued

| Example | Polymer Example | Extruder Temperature (C.) | Paper/Paperboard Stock |
|---|---|---|---|
| 128 | 65 | 210 | Trilayered cup paperboard (210 g/m2 weight) |
| 129 | 67 | 160 | Trilayered cup paperboard (210 g/m2 weight) |
| 130 | 68 | 170 | Trilayered cup paperboard (210 g/m2 weight) |
| 131 | 70 | 160 | Trilayered cup paperboard (210 g/m2 weight) |
| CE 10 | CE 1 | 150 | 18 point paperboard |
| 132 | 1 | 160 | 18 point paperboard |
| 133 | 2 | 170 | 12 point paperboard |
| 134 | 3 | 165 | 18 point paperboard |
| 135 | 4 | 220 | 12 point paperboard |
| 136 | 5 | 210 | 18 point paperboard |
| 137 | 6 | 230 | 12 point paperboard |
| 138 | 35 | 170 | 18 point paperboard |
| 139 | 38 | 160 | 12 point paperboard |
| 140 | 39 | 170 | 18 point paperboard |
| 141 | 43 | 170 | 12 point paperboard |
| 142 | 59 | 210 | 18 point paperboard |
| 143 | 61 | 210 | 12 point paperboard |
| 144 | 65 | 210 | 12 point paperboard |
| 145 | 67 | 160 | 18 point paperboard |
| 146 | 68 | 170 | 12 point paperboard |
| 147 | 70 | 160 | 18 point paperboard |

The resins in examples 100-115 are tested as fast food sandwich wrap packaging, and are also formed and heat-sealed by conventional processes into the shape of envelopes, bags, including for, for example, waste, trash, leaf, airsickness, and groceries.

The resins in examples 116-131 are formed by conventional processes into the shape of cups, glasses, bowls, trays, liquid containers and cartons, including for, for example, milk, juice, water, wine, yogurt, cream, and soda. The resins in examples 132-147 are formed by conventional processes into the shape of trays, boxes, lidded sandwich containers, lidded salad containers, hinged lid sandwich containers, and hinged lid salad containers.

Example 148

Extrusion-coated paper laminates are prepared as described below. A polymer resin produced as described above in Example 4, above, except at a larger scale, is dried at 60° C. overnight. The resin is then placed in a hopper above the inlet of an 1 inch, (2.5 cm), extruder, (Echlin Manufacturing Company Serial Number 0717), with an 18 inch wide film die with a 0.007 inch gap. An 18 inch wide nonwoven fabric is led continuously at a speed of 47-106 feet/minute through an extrusion coating machine made by Bertek Inc., of St. Albans, Vt. The paper to be coated, (11 inch wide, 18 pound basis weight paperstock), is fed over this support fabric, and the assembly is led through a corona treatment, (made by Intercon), through an S-warp between tow 4 inch diameter rolls, heated to 150-260° F., onto a polytetrafluoroethylene-coated, mafte-finished chill roll with a diameter of 12 inches, (30 cm.), at 100-200° F., around 300 degrees of the circumference of this 12 inch diameter roll, while the resin is extruded through the die at a delivery rate appropriate to yield a coating of the desired thickness, at a position between the chill and nip rolls as close as possible to the chill roll, (about 0.25-0.50 inches). The polymer temperature in the extruder is 410° F. and the polymer temperature in the die is 420° F. The polymer temperature may be adjusted to minimize flow irregularity. A film of 0.5 mil thickness is applied to the paper. The paper laminate is tested as a fast food sandwich wrap packaging.

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored.

Example 149

Extrusion-coated paper laminates are prepared as described below. A resin produced similarly as described above in Example 5, above, except at a larger scale, is dried at 60° C. overnight. The resin is then placed in a hopper above the inlet of an 1 inch, (2.5 cm), extruder, (Echlin Manufacturing Company Serial Number 0717), with an 18 inch wide film die with a 0.007 inch gap. An 18 inch wide nonwoven fabric is led continuously at a speed of 47-106 feet/minute through an extrusion coating machine made by Bertek Inc., of St. Albans, Vt. The paper to be coated, (11 inch wide, 18 pound basis weight paperstock), is fed over this support fabric, and the assembly is led through a corona treatment, (made by Intercon), through an S-warp between tow 4 inch diameter rolls, heated to 150-260° F., onto a polytetrafluoroethylene-coated, matte-finished chill roll with a diameter of 12 inches, (30 cm.), at 100-200° F., around 300 degrees of the circumference of this 12 inch diameter roll, while the resin is extruded through the die at a delivery rate appropriate to yield a coating of the desired thickness, at a position between the chill and nip rolls as close as possible to the chill roll, (about 0.25-0.50 inches). The polymer temperature in the extruder is 405° F. and the polymer temperature in the die is 415° F. The polymer temperature may be adjusted to minimize flow irregularity. A film with 0.5-mil thickness is applied to the paper. The paper laminate is tested as a fast food sandwich wrap packaging.

Pieces of the above laminates, (8-inch by 8-inch squares), are placed in a rotary composter with about 0.5 cubic yards squared of mixed municipal solid waste, (from which glass; cans, and much of the light plastic and paper is removed), and sewage sludge in the ratio of about 2:1. The composter is rotated once a week and the temperature and moisture content is monitored. Rate of degradation is measured.

Example 150

A polymer prepared as described in Example 2, except at a larger scale, and poly(lactide), (from the Cargill Dow Company), are dried in a hopper dryer overnight at 60° C. to a −40° C. dew point. On a trilayered paperboard that weighed 210 grams/meter2 with a forward speed of 150 meters/minute is coextruded the Example 2 polymer and poly(lactide) in a weight ratio of 1:3. The melt temperature of the Example 10 polymer is 170° C. and the melt temperature of the poly(lactide) is 240° C. A coated paperboard is obtained where the total weight of the polymeric coating is 19.4 grams/meter$^2$ in a weight ratio of 75 weight percent of the poly(lactide), which formed the outer layer, and 25 weight percent of the polymer from Example 2, which formed the inner layer adhered to the paperboard.

The paperboard prepared above is formed by conventional processes into the shape of cups, glasses, bowls, trays, liquid containers and cartons, including for, for example, milk, juice, water, wine, yogurt, cream, and soda.

Examples 151-156

Calendared paper laminates are prepared by making an assembly of the film produced as described above in Examples noted below in Table 19, coated onto release paper, in contact with a similar sized sheet of paper to be coated, and then pressing the assembly through the nip between a heated polished metal top roll and an unheated resilient (silk) roll at a surface speed of 5 yards/minute, at a temperature of 200° F. and under a pressure of 10 tons. Details of the various paper substrates laminated with the polymers are given in Table 19, below.

TABLE 19

| Example | Film Example | Paper Substrate | Paper Basis Wt./ Thickness (oz/yd.$^2$/mils) |
|---|---|---|---|
| 151 | 7 | Towel, (Scott, Viva) | 1.2/6 |
| 152 | 10 | Towel, (G.P., Sparkle) | 1.3/10 |
| 153 | 15 | Toilet Tissue, (Charmin) | 0.9/6 |
| 154 | 29 | Wrapping Tissue, (white) | 0.5/2 |
| 155 | 50 | Newsprint | 1.5/4 |
| 156 | 81 | Kraft, (recycled) | 2.8/6 |

Pieces of the above laminates, (8-inch by 8-inch squares), are placed in a rotary composter with about 0.5 cubic yards squared of mixed municipal solid waste, (from which glass, cans, and much of the light plastic and paper is removed), and sewage sludge in the ratio of about 2:1. The composter is rotated once a week and the temperature and moisture content is monitored. Rate of disintegration is measured.

Example 157

A laminated stock is produced from a combination of a paperboard and a corona-treated polyester film using a combination of two water-based acrylic adhesive formulations. The paperboard base stock is a bleached white paperboard of the type typically referred to as a solid bleached sulfate (SBS) paperboard, which is well known as a base stock for food packaging materials. The paperboard used is uncoated milk carton stock with a thickness of 0.0235 inch and weighing 282 pounds per 3,000 square feet. The film is produced as described in Example 11, above, and is corona discharge treated by conventional means on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film. The adhesive applied consists of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400° F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons, including for, for example, milk, juice, water, wine, yogurt, cream, and soda.

Examples 158-205

These examples demonstrate the lamination of the films of the present invention onto preformed substrates. The operation is conducted in a Lab Form Inc. forming machine with a 10 by 10-inch platen. The preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 158-165 utilize vacuum lamination by drawing a vacuum through the preformed substrate, which, in turn, draws the film onto the contours of the preformed substrate. Examples 166-172 utilize plug assisted vacuum lamination whereby, in addition to the above described vacuum, a plug helps to push the preheated film from the side opposite the preformed substrate to help reduce film thinning into deep draw preformed substrates. Examples 173-179 utilize pressure lamination by applying an air pressure to the preheated film side opposite to the preformed substrate, which forces the film onto the contours of the preformed substrate. The lamination process typically takes from 5 to 100 seconds, at which time excess film is trimmed off the laminated substrate and the laminated substrate is ejected and cooled.

The preformed substrates laminated in Examples 158-205 are as follows: A 9-inch molded "pulp plate", prepared by conventional processes; a formed frozen dinner paperboard "tray", prepared by conventional processes; a formed paperboard coffee "cup", 3.5 inches tall, prepared by conventional processes; a formed paperboard "bowl", 3 inches tall and 4 inches in diameter, prepared by conventional processes; a 9 inch "foam plate", obtained by carefully stripping off the barrier film from commercially available plates obtained from the EarthShell Company, (Stock Number PL9V00001); a 12 ounce "foam bowl", obtained by carefully stripping off the barrier film from commercially available bowls obtained from the EarthShell Company, (Stock Number BL12V00001); hinged-lid salad and sandwich "foam containers" with a double-tab closure mechanism, obtained by carefully stripping off the barrier film from commercially available containers obtained from the EarthShell Company, (Stock Number CLS00001).

TABLE 20

| Example | Film Example | Film Preheat Time (seconds) | Preformed Substrate |
|---|---|---|---|
| 158 | 7 | 10 | pulp plate |
| 159 | 10 | 40 | tray |
| 160 | 13 | 20 | cup |
| 161 | 26 | 40 | bowl |
| 162 | 47 | 20 | foam plate |

TABLE 20-continued

| Example | Film Example | Film Preheat Time (seconds) | Preformed Substrate |
|---|---|---|---|
| 163 | 73 | 50 | foam bowl |
| 164 | 105 | 55 | foam containers |
| 165 | 84 | 20 | pulp plate |
| 166 | 8 | 10 | cup |
| 167 | 11 | 30 | bowl |
| 168 | 16 | 50 | foam bowl |
| 169 | 28 | 30 | foam containers |
| 170 | 50 | 20 | cup |
| 171 | 74 | 50 | bowl |
| 172 | 85 | 20 | foam bowl |
| 173 | 9 | 10 | pulp plate |
| 174 | 12 | 50 | tray |
| 175 | 18 | 50 | cup |
| 176 | 34 | 30 | bowl |
| 177 | 51 | 25 | foam plate |
| 178 | 75 | 50 | foam bowl |
| 179 | 86 | 25 | foam containers |

What is claimed is:

1. A sulfonated aliphatic-aromatic copolyester comprising an acid component, a glycol component, and 0 to about 5.0 mole percent of a polyfunctional branching agent; wherein said acid component comprises:
   a. about 94.9 to 10.0 mole percent of an aromatic dicarboxylic acid component based on 100 mole percent total acid component,
   b. about 5.0 to 80.0 mole percent of an aliphatic dicarboxylic acid component, based on 100 mole percent total acid component, and
   c. about 0.1 to about 5.0 mole percent of a sulfonate component;
   and wherein said glycol component consists essentially of 1,3-propanediol.

2. The sulfonated aliphatic-aromatic copolyester of claim 1, having an inherent viscosity of at least 0.15, as measured on a 0.5 percent solution of the copolyester in a 50:50 solution of trifluoroacetic acid:dichloromethane solvent system at room temperature.

3. The sulfonated aliphatic-aromatic copolyester of claim 2, wherein said inherent viscosity is at least 0.35 dL/g.

4. The sulfonated aliphatic-aromatic copolyester of claim 1 wherein said sulfonate component is selected from the group consisting of metal salts of 5-sulfoisophthalic acid and metal salts of dimethyl 5-sulfoisophthalate.

5. The sulfonated aliphatic-aromatic copolyester of claim 1 wherein said aromatic dicarboxylic acid component is selected from the group consisting of: terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl)isophthalate, bis(3-hydroxypropyl)isophthalate, bis(4-hydroxybutyl)isophthalate; 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'-diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl -4,4'-methylenebis(benzoate), and mixtures derived therefrom.

6. The sulfonated aliphatic-aromatic copolyester of claim 1, wherein the acid component comprises from about 85 to about 20 mole percent of said aromatic dicarboxylic acid component.

7. The sulfonated aliphatic-aromatic copolyester of claim 1, wherein the acid component comprises from about 80 to about 20 mole percent of said aromatic dicarboxylic acid component.

8. The sulfonated aliphatic-aromatic copolyester of claim 1, wherein said aliphatic dicarboxylic acid component is selected from the group consisting of oxalic acid, dimethyl oxalate, malonic acid, dimethyl malonate, succinic acid, dimethyl succinate, methylsuccinc acid, glutaric acid, dimethyl glutarate, bis(2-hydroxyethyl)glutarate, bis(3-hydroxypropyl)glutarate, bis(4-hydroxybutyl)glutarate, 2-methylglutaric acid, 3-methylglutaric acid, adipic acid, dimethyl adipate, bis(2-hydroxyethyl)adipate, bis(3-hydroxypropyl)adipate, bis(4-hydroxybutyl)adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom.

9. The sulfonated aliphatic-aromatic copolyester of claim 1 wherein said aliphatic dicarboxylic acid component is selected from the group consisting of succinc acid, dimethyl succinate, glutaric acid, dimethyl glutarate, bis(2-hydroxyethyl)glutarate, bis(3-hydroxypropyl)glutarate, bis(4-hydroxybutyl)glutarate, adipic acid, dimethyl adipate, bis(2-hydroxyethyl)adipate, bis(3-hydroxypropyl)adipate, bis(4-hydroxybutyl)adipate and mixtures derived therefrom.

10. The sulfonated aliphatic-aromatic copolyester of claim 1, wherein the acid component comprises from about 15 to about 80 mole percent of said aliphatic dicarboxylic acid component.

11. The sulfonated aliphatic-aromatic copolyester of claim 1, wherein the acid component comprises from about 20 to about 60 mole percent of said aliphatic dicarboxylic acid component.

12. The sulfonated aliphatic-aromatic copolyester of claim 1, wherein said branching agent is selected from the group consisting of: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris(4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-Naphthalenetetracarboxylic dianhydride; citric acid; tetrahydrofuran-2,3,4,5-tetracarboxylic acid; 1,3,5-cyclohexanetricarboxylic acid; pentaerythritol; Glycerol; 2-(hydroxymethyl)-1,3-propanediol; 2,2-bis(hydroxymethyl)propionic acid; and mixtures derived therefrom.

13. The sulfonated aliphatic-aromatic copolyester of claim 1, wherein the copolyester comprises from 0 to about 1.0 mole percent of said branching agent.

14. The sulfonated aliphatic-aromatic copolyester of claim 1, having an inherent viscosity of at least about 0.65 dL/g.

15. The sulfonated aliphatic-aromatic copolyester of claim 1, further comprising a filler.

16. The sulfonated aliphatic-aromatic copolyester of claim 15, wherein said filler comprises a first set of particles having a first average particle size, and a second set of particles having a second average particle size, and wherein second average particle size is at least about 2 times that of said first average particle size.

17. The sulfonated aliphatic-aromatic copolyester of claim 15, wherein said filler consists essentially of particles having an average diameter less than about 40 microns.

18. The sulfonated aliphatic-aromatic copolyester of claim 15, wherein said filler consists essentially of particles having an average diameter less than about 20 microns.

19. A blend comprising a sulfonated aliphatic-aromatic copolyester of claim 1 and at least one other polymer.

20. The blend of claim 19 wherein said other polymer is biodegradable.

21. The blend of claim 20 wherein said biodegradable polymer is selected from the group consisting of poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

22. The blend of claim 19 wherein said other polymer is nonbiodegradable.

23. The blend of claim 19 wherein said other polymer is a natural polymer.

24. The blend of claim 23 wherein said natural polymer is a starch.

25. A shaped article formed from a sulfonated aliphatic-aromatic copolyester of claim 1.

26. A shaped article of claim 25 selected from the group consisting of films, sheets, fibers, melt blown containers, molded parts, and foamed parts.

27. A film comprising the sulfonated aliphatic-aromatic copolyester of claim 1.

28. The film of claim 27, having a thickness from about 0.025 mm to about 0.15 mm.

29. An oriented film according to claim 28.

30. The film of claim 29 wherein said film is biaxially oriented.

31. The film of claim 29 wherein said film is uniaxially oriented.

32. A multilayer film comprising a layer comprising a sulfonated aliphatic-aromatic copolyester of claim 1.

33. An article comprising a substrate and a coating on said substrate, said coating comprising an aliphatic-aromatic copolyetherester of claim 1.

34. The article of claim 33 wherein said coating has a thickness from about 0.2 to about 15 mils.

35. The article of claim 33 wherein said coating has a thickness from about 0.5 to about 2 mils.

36. The article of claim 33 wherein said substrate is selected from the group consisting of textiles, nonwovens, foil, paper, paperboard, and metals.

37. An article comprising a substrate having laminated thereon a sulfonated aliphatic-aromatic copolyester of claim 1.

38. The article of claim 37 wherein said substrate is selected from the group consisting of paper, paperboard, cardboard, fiberboard, cellulose, starch, plastic, polystyrene foam, glass, metals, polymeric foams, organic foams, inorganic foams, organic-inorganic foams, and polymeric films.

39. A package comprising an article of claim 38.

40. A wrap comprising a sulfonated aliphatic-aromatic copolyester of claim 1.

41. A sheet comprising a sulfonated aliphatic-aromatic copolyester of claim 1.

42. The sheet of claim 41, having a thickness of at least about 0.50 mm.

43. A fiber comprising a sulfonated aliphatic-aromatic copolyester of claim 1.

44. The fiber of claim 43 having a denier from about 0.1 to about 100.

45. The fiber of claim 44 having a denier from about 0.5 to 20.

46. A fiber comprising a sulfonated aliphatic-aromatic copolyester of claim 1 and at least one other polymer.

47. The fiber of claim 46 wherein said fiber comprises a blend of said sulfonated aliphatic-aromatic copolyester and one or more natural fibers.

48. The fiber of claim 46 wherein said fiber is a heterogeneous fiber.

49. A foamed article comprising a sulfonated aliphatic-aromatic copolyester of claim 1.

50. A foamed article comprising a sulfonated aliphatic-aromatic copolyester of claim 15.

51. A shaped article formed from a sulfonated aliphatic-aromatic copolyester of claim 15.

52. A shaped article of claim 51 selected from the group consisting of films, sheets, fiber, melt blown containers, molded parts, and foamed parts.

53. A film comprising a sulfonated aliphatic-aromatic copolyester of claim 15.

54. The film of claim 53, having a thickness from about 0.025 mm to about 0.15 mm.

55. An oriented film according to claim 53.

56. A multilayer film comprising a layer comprising a sulfonated aliphatic-aromatic copolyester of claim 15.

57. An article comprising a substrate and a coating on said substrate, said coating comprising a sulfonated aliphatic-aromatic copolyester of claim 15.

58. An article comprising a substrate having laminated thereon a sulfonated aliphatic-aromatic copolyester of claim 15.

59. A wrap comprising a sulfonated aliphatic-aromatic copolyester of claim 15.

60. A sheet comprising a sulfonated aliphatic-aromatic copolyester of claim 15.

61. A foamed article comprising a sulfonated aliphatic-aromatic copolyester of claim 19.

62. A shaped article formed from a sulfonated aliphatic-aromatic copolyester of claim 19.

63. A shaped article of claim 62 selected from the group consisting of films, sheets, fibers, melt blown containers, molded parts, and foamed parts.

64. A film comprising a sulfonated aliphatic-aromatic copolyester of claim 19.

65. The film of claim 64, having a thickness from about 0.025 mm to about 0.15 mm.

66. An oriented film according to claim 64.

67. A multilayer film comprising a layer comprising a sulfonated aliphatic-aromatic copolyester of claim 19.

68. An article comprising a substrate and a coating on said substrate, said coating comprising a sulfonated aliphatic-aromatic copolyester of claim 19.

69. An article comprising a substrate having laminated thereon a sulfonated aliphatic-aromatic copolyester of claim 19.

70. A wrap comprising a sulfonated aliphatic-aromatic copolyester of claim 19.

71. A sheet comprising a sulfonated aliphatic-aromatic copolyester of claim 19.

72. A foamed article comprising a sulfonated aliphatic-aromatic copolyester of claim 23.

73. A shaped article formed from a sulfonated aliphatic-aromatic copolyester of claim 23.

74. A shaped article of claim 73 selected from the group consisting of films, sheets, fiber, melt blown containers, molded parts, and foamed parts.

75. A film comprising a sulfonated aliphatic-aromatic copolyester of claim 23.

76. The film of claim 75, having a thickness from about 0.025 mm to about 0.15 mm.

77. An oriented film according to claim 75.

78. A multilayer film comprising a layer comprising a sulfonated aliphatic-aromatic copolyester of claim 23.

79. An article comprising a substrate and a coating on said substrate, said coating comprising a sulfonated aliphatic-aromatic copolyester of claim 23.

80. An article comprising a substrate having laminated thereon a sulfonated aliphatic-aromatic copolyester of claim 23.

81. A wrap comprising a sulfonated aliphatic-aromatic copolyester of claim 23.

82. A sheet comprising a sulfonated aliphatic-aromatic copolyester of claim 23.

83. A process for producing a package, comprising providing a substrate; forming said substrate into a desired package form; providing a sulfonated aliphatic-aromatic copolyester comprising an acid component, a glycol component, and 0 to about 5.0 mole percent of a polyfunctional branching agent; wherein said acid component comprises:
 a. about 94.9 to 10.0 mole percent of an aromatic dicarboxylic acid component based on 100 mole percent total acid component,
 b. about 5.0 to 80.0 mole percent of an aliphatic dicarboxylic acid component, based on 100 mole percent total acid component, and
 c. about 0.1 to about 5.0 mole percent of a sulfonate component, based on 100 mole percent total acid component; and wherein said glycol component consists essentially of 1,3-propanediol; and
 laminating or coating said substrate with said sulfonated aliphatic-aromatic copolyester to form said package.

84. The process of claim 83 wherein said substrate comprises a material selected from the group consisting of paper, paperboard, inorganic foams, organic foams, and inorganic-organic foams.

85. The process of claim 83 wherein said package form is selected from the group consisting of wrappers, stretch wrap films, bags, cups, trays, cartons, boxes, bottles, crates, packaging films, blister pack wrappers, skin packaging, and hinged containers.

86. A process for producing a sulfonated aliphatic-aromatic copolyester, comprising providing a reaction mixture comprising an aromatic dicarboxylic component, an aliphatic dicarboxylic acid component, a sulfonate component, a first glycol component consisting essentially of 1,3-propanediol, and optionally a polyfunctional branching agent; and allowing said aromatic dicarboxylic acid component, said aliphatic dicarboxylic acid component, said sulfonate component, said first glycol component and said polyfunctional branching agent to polymerize to form a sulfonated aliphatic-aromatic copolyester comprising an acid component, and a glycol component, wherein the acid component comprises
 a. about 94.9 to 10.0 mole percent of an aromatic dicarboxylic acid component based on 100 mole percent total acid component,
 b. about 5.0 to 80.0 mole percent of an aliphatic dicarboxylic acid component, based on 100 mole percent total acid component, and
 c. about 0.1 to about 5.0 mole percent of a sulfonate component, and wherein
 the glycol component consists essentially of 1,3-propanediol as said first glycol component, based on 100 mole percent total glycol component.

87. The process of claim 86, comprising providing said polyfunctional branching agent in a quantity such that said polyester comprises up to 5.0 mole percent of said polyfunctional branching agent, based on the total of said first glycol component and said polyfunctional branching agent.

* * * * *